US006750284B1

(12) United States Patent
Dharmarajan et al.

(10) Patent No.: US 6,750,284 B1
(45) Date of Patent: Jun. 15, 2004

(54) THERMOPLASTIC FILLED MEMBRANES OF PROPYLENE COPOLYMERS

(75) Inventors: N. Raja Dharmarajan, Houston, TX (US); Mike C. Bulawa, Baytown, TX (US); Sudhin Datta, Houston, TX (US); Andy H. Tsou, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/570,969

(22) Filed: May 15, 2000

Related U.S. Application Data
(60) Provisional application No. 60/133,966, filed on May 13, 1999.

(51) Int. Cl.[7] .............................. C08L 3/36; C08L 23/16
(52) U.S. Cl. ....................... 524/515; 524/427; 524/451; 525/240
(58) Field of Search .................................. 525/240, 241, 525/88; 524/427, 451, 435, 442, 449, 528, 505

(56) References Cited

U.S. PATENT DOCUMENTS

| | | |
|---|---|---|
| 3,282,992 A | 11/1966 | Harris |
| 3,378,606 A | 4/1968 | Kontos |
| 3,853,969 A | 12/1974 | Kontos |
| 3,882,197 A | 5/1975 | Fritz et al. |
| 3,888,949 A | 6/1975 | Shih |
| 4,368,565 A | 1/1983 | Schwartz |
| 4,461,872 A | 7/1984 | Su |
| 4,540,753 A | 9/1985 | Cozewith et al. |
| 5,057,475 A | 10/1991 | Canich et al. |
| 5,145,819 A | 9/1992 | Winter et al. |
| 5,153,157 A | 10/1992 | Hlatky et al. |
| 5,198,401 A | 3/1993 | Turner et al. |
| 5,239,022 A | 8/1993 | Winter et al. |
| 5,243,001 A | 9/1993 | Winter et al. |
| 5,276,208 A | 1/1994 | Winter et al. |
| 5,290,886 A | 3/1994 | Ellul |
| 5,296,434 A | 3/1994 | Karl et al. |
| 5,304,614 A | 4/1994 | Winter et al. |
| 5,329,033 A | 7/1994 | Apaleck et al. |
| 5,374,752 A | 12/1994 | Winter et al. |
| 5,397,832 A | 3/1995 | Ellul |
| 5,510,502 A | 4/1996 | Sugano et al. |
| 5,594,080 A | 1/1997 | Waymouth et al. |
| 5,672,668 A | 9/1997 | Winter et al. |
| 5,891,946 A * | 4/1999 | Nohara et al. ............... 524/427 |

FOREIGN PATENT DOCUMENTS

| | | | | |
|---|---|---|---|---|
| DE | 19749765 | 6/1998 | ......... | C08F/210/02 |
| EP | 0545196 | 6/1993 | ............ | E04D/5/06 |
| EP | 0 549 900 B1 | 8/1996 | | |
| EP | 0 576 970 B1 | 1/1998 | | |
| EP | 877052 A2 * | 11/1998 | ........... | C08L/23/10 |
| EP | 0890612 | 1/1999 | ........... | C08L/23/14 |
| JP | 10324751 | 12/1998 | | |
| WO | WO 97/40080 | 10/1997 | | |
| WO | WO9829504 | 7/1998 | ........... | C08L/23/14 |
| WO | WO 98/37144 | 8/1998 | | |

OTHER PUBLICATIONS

"Near Monodisperse Ethylene–Propylene Copolymers by Direct Ziegler–Natta Polymerization. Preparation, Characteristization, Properties", Ver Strate, et al, Macromolecules, vol. 21 No. 12, p. 3360–3371, Dec. 1988.

"Elastomeric Polypropylenes from Alumina–Supported Tetraalkyl Group IVB Catalyst. 1. Synthesis and Properties of High Molecular Weight Stereoblock Homopolymers", Collette, et al, Macromolecules, vol. 22, No. 10, p. 3851–3866, Oct. 1989.

"Two–State Propagation Mechanism for Propylene Polymerization Catalyzed by rec–[anti–Ethylidene($1-\eta^5$-tetramethylcyclopentadienyl)($1-\eta^5$–indenyl)]dimethyltitanium", Chien, et al, Journal of American Chemical Society, vol. 113, No. 22, p. 8569–8570, Oct. 23, 1991.

"Stereoblock Polypropylene: Ligand Effects on the Stereospecificity of 2–Arylindene Zirconocene Catalyst", Hauptman, et al, Journal of the American Chemical Society, vol. 117, No. 46, p. 11586–11587, Nov., 22, 1995.

"Elastomeric Poly(propylene): Influence of Catalyst Structure and Polymerization Condicitons on Polymer Structure and Properties" Gauthier, et al, Macromolecules, vol. 28, No. 11, p. 3771–3778, May 22, 1995.

"Modeling Nonheme Diiron Enzymes: Hydrocarbon Hydroxylation and Desaturation by a High–Valent $Fe_2O_2$ Diamond Core", Kim, et al, Journal of the American Chemical Society, vol. 119, No. 15, p. 3635–3636, Apr. 16, 1997.

(List continued on next page.)

Primary Examiner—Robert Harlan

(57) ABSTRACT

The invention relates to a thermoplastic membrane (e.g. film, fluid barrier, and the like) which is formed from a blend of:

a) a first polymer component (FPC), wherein said FPC comprises a propylene-ethylene copolymer containing from 80 to 93 percent by weight of units derived from propylene, and having a melting point derived from stereoregular polypropylene sequences, as determined by differential scanning calorimetry (DSC), in the range of from 25° C. to 70° C., and a heat of fusion of from 2 J/g to 25 J/g;

b) an inorganic filler;

c) a processing oil, and d) optionally, a second polymer component (SPC), wherein said SPC is a stereoregular polypropylene containing less than 7 percent by weight of units derived from ethylene or alpha-olefin monomer containing from 4 to 8 carbon atoms and having melting point, as determined by DSC, greater than 130° C., and a heat of fusion greater than 80 J/g.

13 Claims, 3 Drawing Sheets

OTHER PUBLICATIONS

U.S. patent application Ser. No. 09/569,362, filed May 11, 2000 (Inventors S. Datta and J. A. Middlesworth), entitled Elastic Films Including Crystalline Polymer and Crystallizable Polymers of Propylene, assigned to ECPI and claiming priority to Provisional Application No. 60/133,966, filed May 13, 1999.

U.S. patent application Ser. No. 09/570,298, filed May 12, 2000 (Inventors N. R. Dharmarajan, M. C. Bulawa, S. Datta; and A. H. Tsou), entitled "Thermoplastic Filled Membranes of Propylene Copolymers", assigned to ECPI and claiming priority to Provisional Application No. 60/133,966, filed May 13, 1999.

Derwent English Abstract of Reference AG, DE19749765.

Derwent English Abstract of Reference AH, EP0890612.

Derwent Abstract for foreign language publication–EP 0 549 900 B1.

Derwent Abstract for foreign language publication–EP 0 576 970 B1.

"Near Monodisperse Ethylene–Propylene Copolymers by Direct Ziegler–Natta Polymerization. Preparation, Characteristization, Properties", Ver Strate, et al, Macromolecules, vol. 21 No. 12, p. 3360–3371, Dec. 1998.

"Elastomeric Polypropylenes from Alumina–Supported Tetraalkyl Group IVB Catalyst. 1. Synthesis and Properties of High Molecular Weight Stereoblock Homopolymers", Collette, et al, Macromolecules, vol. 22, No. 10, p.3851–3866, Oct. 1989.

"Two–State Propagation Mechanism for Propylene Polymerization Catalyzed by rec–[anti–Ethylidene($1-\eta5-$tetramethylcyclopentadienyl)($1-\eta5-$indenyl)]dimethyltitanium", Chien, et al, Journal of American Chemical Society, vol. 113, No. 22, p. 8569–8570, Oct. 23, 1991.

"Stereoblock Polypropylene: Ligand Effects on the Stereospecificity of 2–Arylindene Zicronocene Catalyst", Hauptman, et al, Journal of the American Chemical Society, vol. 117, No. 46, p. 11586–11587, Nov. 22, 1995.

"Elastomeric Poly(propylene): Influence of Catalyst Structure and Polymerization Conditions on Polymer Structure and Properties" Gauthier, et al, Macromolecules, vol. 28, No. 11, p. 3771–3778, May. 22, 1995.

"Modeling Nonheme Diiron Enzymes: Hydrocarbon Hydroxylation and Desaturation by a High–Valent $Fe2O2$ Diamond Core", Kim, et al, Journal of the American Chemical Society, vol. 119, No. 15, p. 3635–3636, Apr. 16, 1997.

* cited by examiner

THERMOPLASTIC FILLED MEMBRANES OF PROPYLENE COPOLYMERS

RELATED PATENT APPLICATIONS

This patent application claims priority to and fully incorporates by reference U.S. Ser. No. 60/133,966, filed May 13, 1999.

FIELD OF THE INVENTION

The invention relates to membranes comprising a blend of at least one thermoplastic polyolefin component having crystallinity derived from the presence of polypropylene sequences, an inorganic filler, and a processing oil.

BACKGROUND

Blends of one or more polyolefin polymers, one or more fillers, and one or more process oil plasticizers have historically been used to form membranes having a desired balance of properties for severe service conditions such as roof sheeting. Such composition are disclosed in U.S. Pat. Nos. 5,854,327, 5,859,114, 5,468,550, 5,582,890, 5,370,755, 5,389,715, 5,242,970, 5,286,798, and 5,256,228, among others. In general, the polymer compositions described in these inventions comprise ethylene-propylene-diene terpolymers (EPDM) or other rubber components that are cured or crosslinked to form a thermoset composition and/or materials high in ethylene crystallinity. Typically, any crystallinity present in these blends is derived from polyethylene sequences.

The term "membrane," as used herein, refers to films useful in a variety of uses such as roof sheeting, geo membranes, pond liners, and other applications requiring long term exposure to extreme environmental conditions with minimal degradation. These films are typically much thicker, possess less elasticity, and require greater long term resistance to severe environmental conditions resulting from roof movement, heavy winds, freeze-thaw cycles, and high temperatures than their lighter duty, disposable counterparts such as those films used in food and medical applications. It would be particularly advantageous for such membranes to be produced from thermoplastic compositions that possess adequate or superior tensile and tear strength properties from polypropylene crystallinity without the need for curing or crosslinking, thereby facilitating their production in conventional thermoplastic processing equipment. It would further be desirable for such membranes to possess a degree of tack sufficient to produce a desired level of bonding force where the edges of multiple sheets of the membrane material meet and overlap to form a continuous barrier, for example, over an entire rooftop.

For these membranes, it would be particularly advantageous for such thermoplastic membranes to have the following properties:

1. Tensile elongation, as measured by ASTM Method D412 greater than 100%, more preferably greater than 300% and most preferably greater than 500%.
2. Tensile strength greater than 5 Mpa, as measured by ASTM Method D412 preferably greater than 10 MPa and more preferably greater than 13 MPa.
3. Shore hardness, as measured by ASTM Method D412 less than 100 Shore A, preferably less than 80 Shore A and more preferably less than 60 Sh A
4. Softening point, greater than 45° C., preferably greater than 60° C. and most preferably greater than 80° C.
5. A glass transition temperature substantially below 0° C.
6. Small changes in these properties on exposure to environmental conditions for an extended period.
7. Self tack greater than 10 KN/m$^2$ U.S. Pat. No. 3,888,949 suggests the synthesis of blend compositions containing isotactic polypropylene and copolymers of propylene and an alpha-olefin, containing between 6–20 carbon atoms, which have improved elongation and tensile strength over either the copolymer or isotactic polypropylene. Copolymers of propylene and alpha-olefin are described wherein the alpha-olefin is hexene, octene or dodecene. However, the copolymer is made with a heterogeneous titanium catalyst resulting in copolymers with non-uniform composition distribution and a broad molecular weight distribution. Non-uniform intramolecular compositional distribution is evident in U.S. Pat. No. 3,888,949 by the use of the term "block" in the description of the polymer where the copolymer is described as having "sequences of different alpha-olefin content." Within the context of the invention described above the term sequences describes a number of olefin monomer residues linked together by chemical formed during polymerization.

More recently several authors have shown the formation of more refined structures of partially atactic, partially isotactic polypropylene which have elastomeric properties. It is believed that in these components each molecule consists of portions which are isotactic and therefore crystallizable while the other portions of the same polypropylene molecule are atactic and therefore amorphous and not crystallizable. Examples of these propylene homopolymers containing different levels of isotacticity in different portions of the molecule are described in U.S. Pat. No. 5,594,080, in the article in the Journal American Chemical Society (1995), 117, p. 11586; in the article in the Journal American Chemical Society (1997), 119, p. 3635; in the journal article in the Journal of the American Chemical Society (1991), 113, pp. 8569–8570, and in the journal article in the Journal Macromolecules (1995) 28, pp. 3771–3778. These articles describe the copolymer of the present composition but do not describe the compositions obtained in blends with a more crystalline polymer such as isotactic polypropylene, nor its resultant desirable physical properties.

U.S. Pat. Nos. 3,853,969 and 3,378,606, suggest the formation of in situ blends of isotactic polypropylene and "stereo block" copolymers of propylene and another olefin of 2 to 12 carbon atoms, including ethylene and hexene. The copolymers of this invention are necessarily heterogeneous in intermolecular and intramolecular composition distribution. This is demonstrated by the synthesis procedures of these copolymers which involve sequential injection of monomer mixtures of different compositions to synthesize polymeric portions of analogously different compositions. In addition, FIG. 1 of both patents shows that the "stereo block" character, which is intra or intermolecular compositional differences in the context of the description of the present invention, is essential to the benefit of the tensile and elongation properties of the blend of these patents. Moreover, all of these compositions either do not meet all of the desired properties for various applications.

Similar results are purportedly achieved in U.S. Pat. No. 3,262,992 wherein the authors suggest that the addition of a stereoblock copolymer of ethylene and propylene to isotactic polypropylene leads to improved mechanical properties of the blend compared to isotactic polypropylene alone. However, these benefits are described only for the stereoblock copolymers of ethylene and propylene. These copolymers were synthesized by changing the monomer concentrations in the reactor with time. This is shown in examples 1 and 2. The stereoblock character of the polymer is graphically shown in the molecular description (column 2, line 65) and contrasted with the undesirable random copolymer (column 2, line 60). The presence of stereoblock character in these polymers is shown by the high melting point of these polymers and the poor solubility in hydrocarbons at ambient temperature.

SUMMARY OF THE INVENTION

The invention relates to a thermoplastic membrane (e.g. film, fluid barrier, and the like) which is formed from a blend of:

a) from 30 to 90 percent by weight of a first polymer component (FPC), wherein said FPC comprises a propylene-ethylene copolymer containing from 80 to 93 percent by weight of units derived from propylene, and having a melting point derived from stereoregular polypropylene sequences, as determined by differential scanning calorimetry (DSC), in the range of from 25° C. to 70° C., and a heat of fusion of from 2 J/g to 25 J/g;

b) from 1 to 40 percent by weight of an inorganic filler; and c) from 1 to 25 percent by weight of a processing oil, wherein the sum of components in said is 100 percent.

In one embodiment, the membrane further comprises up to 40 percent by weight of a second polymer component (SPC), wherein said SPC is a stereoregular polypropylene containing less than 7 percent by weight of units derived from ethylene or alpha-olefin monomer containing from 4 to 8 carbon atoms and having melting point, as determined by DSC, greater than 130° C., and a heat of fusion greater than 80 J/g.

In another embodiment, the membrane of the invention contains an FPC which is a blend of two polymers. The additional first polymer component (FPC2) is a second propylene-ethylene copolymer containing at least 75 weight percent units derived from propylene and at least 5 weight percent less units derived from propylene than the first propylene-ethylene copolymer of the FPC. Preferably the FPC2 has a melting point less than 100° C. and a heat of fusion less than 60 J/g.

DETAILED DESCRIPTION

Figure 1:
FIG. 1 is a composition of the invention blend comprising 78% of FPC and the balance of SPC.

We have shown that blends of a novel ethylene propylene copolymer in conjunction with isotactic polypropylene, particularly in conjunction with an inorganic filler provide a thermoplastic membrane superior to the previous inventions.

The thermoplastic membranes compositions of embodiments of our invention generally are comprised of a crystallizable FPC comprising an alpha-olefin (other than propylene) and propylene copolymer. Softness is generally indicated by Shore hardness A, where for the instant thermoplastic membranes the values of hardness (Sh A) less than 100, more preferably less than 80 and more preferably less than 60 are preferred. A particular embodiment of the invention is the addition of a crystalline SPC comprising isotactic polypropylene to the FPC. A particular embodiment of the invention contains a crystallizable FPC2 comprising an alpha-olefin (other than propylene) and propylene copolymer.

Particular embodiments of the membranes of this invention directed to specific end uses may comprise additional components, such as fillers, process oil plasticizers, antioxidants and other additives. Such end uses include roof sheeting, geo membranes as well as pond liners. The greatest need is for polymer compositions, which are not vulcanized and can easily be formed, in conventional plastic processing equipment.

There is a need therefore for thermoplastic membranes composed generally completely of polyolefins. Such membranes are made by a blend comprising a crystalline stereospecific polypropylene component and a crystallizable ethylene-propylene copolymer. Additional components, such as process oil to improve processability and inorganic fillers to increase abrasion resistance are possible. The crystalline stereospecific polypropylene component is required for tensile strength while the crystallizable ethylene-propylene copolymer provides good elastic recoverability, softness and the ability to incorporate process oils. In addition, these blends have a glass transition temperature below that of polypropylene.

Embodiments of our invention include forming thermoplastic membranes from predominantly crystallizable, semicrystalline polyolefin polymers. Further, embodiments include improving the aforementioned properties of thermoplastic membranes by blending a generally minor amount of a crystalline polyolefin where the type of crystallinity of the two components are similar, as for instance both will be substantially isotactic or syndiotactic, but the amount of crystallinity differs. Isotactic and syndiotactic arrangement of monomers in a polymer are defined in "Principles of Polymerization" by G. Odian ($3^{rd}$ Ed), 1991, p. 607 (John Wiley) which is incorporated herein by reference. Substantially pertains to an arrangement of monomer units where greater than 50% of adjacent monomer units have the defined tacticity. Other embodiments of our invention are directed to polyolefins and polyolefin blends where the crystallizable and crystalline components have a stereoregular polypropylene component, especially preferred is isotactic polypropylene. A crystalline polymer is one with a heat of fusion, a measured by Differential Scanning Calorimetry (DSC) to be greater than 45 J/g. A crystallizable polymer is one with a heat of fusion, as measure by DSC, to be less than 45 J/g. In the semicrystalline, crystallizable polymer this is achieved with a crystallizable copolymer of propylene and a $C_2$, $C_3$–$C_{20}$ alpha-olefin, preferably propylene and at least one other alpha-olefin having less than 6 carbon atoms, and more preferably propylene and ethylene. Improvements in the properties of the semicrystalline, crystallizable copolymer can be obtained by blending it with the crystalline stereoregular polypropylene component, particularly isotactic polypropylene. This crystallizable copolymer is less crystalline than the crystalline isotactic polypropylene. In the crystallizable copolymer the propylene is polymerized substantially stereospecifically. Preferably, the crystallizable copolymer is an ethylene propylene crystallizable copolymer, e.g., ethylene propylene elastomer that is thermoplastic. The crystallizable copolymer has a substantially uniform composition distribution, preferably as a result of polymerization with a metallocene catalyst. Composition distribution is a property of these crystallizable copolymers indicating a statistically significant intermolecular or intramolecular difference in the composition of the polymer.

Methods for measuring compositional distribution are described later.

We have found that a crystallizable, semicrystalline propylene alpha olefin crystallizable copolymer, hereinafter referred to as the "first polymer component" (FPC) can be used to make thermoplastic membranes. The properties of the membrane can be improved by blending an amount of a crystalline propylene polymer, hereinafter referred to as the "second polymer component", (SPC). These blends have simultaneously the following properties:

1. Tensile elongation, as measured by ASTM Method D412 greater than 100%, more preferably greater than 300% and most preferably greater than 500%.
2. Tensile strength greater than 5 Mpa, as measured by ASTM Method D412 preferably greater than 10 MPa and more preferably greater than 13 MPa.
3. Shore hardness, as measured by ASTM Method D412 less than 100 Shore A, preferably less than 80 Shore A and more preferably less than 60 Sh A
4. Softening point, greater than 45° C., preferably greater than 60° C. and most preferably greater than 80° C.
4. A glass transition temperature substantially below 0° C.
5. Small changes in these properties on exposure to environmental conditions for an extended period
6. Self tack greater than 5 $KN/m^2$, preferably greater than 10 $KN/m^2$ It is possible to have a third polymeric component which is another crystallizable propylene alpha olefin copolymer indicated as FPC2 in the text below, which has crystallinity intermediate between the FPC and the SPC. The FPC2 also has a narrow composition distribution and is made with a metallocene catalyst. The addition of FPC2 leads to a finer morphology of dispersion of the FPC and improvements in some of the properties of the blend of FPC and SPC. In addition, these blends for thermoplastic membranes may contain non-polymeric ingredients such as process oil, inorganic components such as particulate fillers such as carbon black, mica or calcium carbonate. FPC2 describes those polymers or sequences which are substantially crystalline in the undeformed state (however, less crystalline than the SPC). Further crystallization may also occur in the presence of the crystalline polymer such as SPC.

The blends and the thermoplastic membranes made therefrom, contain a continuous phase of low crystallinity. For blends containing at least two polymeric components, an additional dispersed phase of greater crystallinity is also present. In this latter case the sizes of the individual domains of the dispersed phase are very small with the smallest length dimension for the dispersed phase being less than 5 $\mu$m. This phase size of the dispersed phase is maintained during processing even without crosslinking. The dispersed phase consists of a crystalline mixture of SPC with some amount of FPC2 (when present in the blend) and FPC, due to thermodynamic mixing of polymers. The continuous phase consists of the balance of the polymers not included in the dispersed phase. Blends directed to low flexural modulus may have in addition, a heterogeneous phase morphology with continuous phases of lower and greater crystallinity.

Commonly available reactor copolymer consisting of a single phase blend of isotactic polypropylene and copolymers of propylene and ethylene are not included within the scope of the present invention since they are a single phase with no prominent dispersed or continues phases. Impact copolymer, thermoplastic olefins and thermoplastic elastomers have heterophase morphology made by a combination of a SPC and a FPC of the present invention. However, the more crystalline polymer is the continues phase in these blends and they are excluded from the present invention. The components of the blend in both cases are also compatible to the extent that no preformed or insitu formed compatibilizer needs to be added to attain and retain this fine morphology. Furthermore, embodiments of this invention describe improving the mechanical deformation recoverability of the aforementioned blends by annealing the blends and/or mechanically orienting the membranes formed from these blends.

The membranes made from these blends are made either by calendering, casting, compression molding either batch or continuous or blowing films or by any of the other procedures known in the art. Typically, these films are between 0.5 to 0.001 inch in thickness.

A preferred composition for the formation of the membranes comprises 0%–95% by weight, preferably 2%–30% by weight and more preferably 5%–25% by weight of SPC and the balance of the composition being the FPC. The FPC comprising a crystallizable copolymer of the FPC of the invention, has isotactically crystallizable propylene sequences with a crystallinity less than 40 J/g and greater than 65% by weight units derived from propylene and preferably greater than 80% by weight units derived from propylene.

According to another embodiment, a thermoplastic polymer blend for the preparation of the membrane composition of the invention comprises a SPC and a FPC with added process oil. The process oil may consist of paraffinic oils, aromatic oils, oligomeric esters and ethers as well as any other plasticizer commonly used for polyolefin compounds. The SPC comprises isotactic polypropylene, a reactor copolymer or an impact copolymer as described above. The balance of the polymer blend composition may consist of a mixture of the process oil and the FPC and FPC2 if used.

According to yet another embodiment, a thermoplastic polymer blend for the preparation of the membrane composition of the invention comprises a SPC and a FPC with added inorganic filler. The inorganic filler may consist of carbon black, silica, whiting, calcium carbonate, clays as well as microparticular clays commonly referred to as nanocomposites. The balance of the polymer blend composition may consist of a mixture of the process oil and the FPC and FPC2 if used.

Still further embodiments of our invention are directed to a process for preparing thermoplastic blends suitable for the preparation of thermoplastic membranes is contemplated. The process comprises: (a) polymerizing propylene or a mixture of propylene and one or more monomers selected from $C_2$ or $C_3$–$C_{20}$ alpha olefins in the presence of a polymerization catalyst wherein a substantially isotactic propylene polymer containing at least 90% by weight polymerized propylene is obtained; (b) polymerizing a mixture of ethylene and propylene in the presence of a chiral metallocene catalyst, wherein a crystallizable copolymer of ethylene and propylene is obtained comprising up to 35% by weight ethylene and preferably up to 20% by weight ethylene and containing isotactically crystallizable propylene sequences; and (c) blending the propylene polymer of step (a) with the crystallizable copolymer of step (b) to form a blend. During the blending procedure plasticizers and inorganic filler are added. Prochiral catalysts suitable for the preparation of crystalline and semi-crystalline polypropylene copolymers include those described in U.S. Pat. Nos. 5,145,819; 5,304,614; 5,243,001; 5,239,022; 5,329,033; 5,296,434; 5,276,208; 5,672,668; 5,304,614; and 5,374,752;

and EP 549 900 and 576 970, all incorporated herein by reference. Additionally, metallocenes such as those described in U.S. Pat. No. 5,510,502 (incorporated herein by reference) are suitable for use in this invention.

According to still a further embodiment, the invention is directed to a process for preparing of thermoplastic membranes from these thermoplastic polymer blends. The process comprises: (a) generating the thermoplastic blend (as described immediately above), (b) forming the thermoplastic membrane by casting, blowing or compression molding as described in the art, (c) annealing the resulting membranes for a period of time less than 20 days at a temperature not to exceed 170° C. and (d) orienting the membrane either uniaxially or biaxially by extension to not greater than 700% of its original dimension. The annealing and/or the orientation may be conducted in a single operation or as distinctive sequential operations.

Another embodiment includes a thermoplastic membrane including a blend of polymers composed entirely of polyolefins, the thermoplastic membrane having excellent tensile strength, elongation, softness and softening point with a glass transition temperature substantially below 0° C., the blend of polymers being substantially noncrosslinked, comprising a first polymer component (FPC), the FPC has:

i) a composition distribution such that at least 75 weight percent of the polymer is isolated in two adjacent soluble fractions, each of these fractions has a composition difference of no greater than 20% (relative) of the average weight percent ethylene content of the whole first polymer component;

ii) a melting point, as determined by differential scanning calorimeter (DSC) less than 105° C.;

iii) a heat of fusion less than 45 J/g;

iv) propylene and an alpha-olefin present in said FPC, wherein the alpha-olefin is present in the FPC from 4–35 weight percent, wherein the alpha-olefin is selected from the group consisting of ethylene and C4–C12 alpha-olefin, the propylene making up the balance of the FPC. The FPC is present in the blend in the range of from 5–100 weight percent.

Also included is a second polymer component (SPC), the SPC being crystalline polymer having:

i) a melting point above 115° C.;

ii) a heat of fusion above 60 J/g;

iii) propylene present at least 90 weight percent, and an alpha-olefin present at less than 9 weight percent, wherein the total of the propylene and the alpha-olefin in the SPC adds to 100 weight percent;

the SPC being present in the blend in the range of from 0–95 weight percent.

These and other features, aspects and advantages of the present invention will become better understood with reference to the following description and appended claims.

The First Polymer Component (FPC)

The FPC of the polymer blend compositions of the present invention comprises a crystallizable copolymer of propylene and another alpha-olefin having less than 10 carbon atoms, preferably ethylene. The crystallinity of the FPC arises from crystallizable stereoregular propylene sequences. The FPC has the following characteristics:

(A) The FPC of the present invention preferably comprises a random crystallizable copolymer having a narrow compositional distribution. The term "crystallizable," as used herein for FPC, describes those polymers or sequences which are mainly amorphous in the undeformed state, but can crystallize upon stretching, annealing or in the presence of a crystalline polymer. Crystallization is measured by DSC, as described herein. While not meant to be limited thereby, it is believed that the narrow composition distribution of the first polymer component is important. The intermolecular composition distribution of the polymer is determined by thermal fractionation in a solvent. A typical solvent is a saturated hydrocarbon such as hexane or heptane. This thermal fractionation procedure is described below. Typically, approximately 75% by weight and more preferably 85% by weight of the polymer is isolated as a one or two adjacent, soluble fraction with the balance of the polymer in immediately preceding or succeeding fractions. Each of these fractions has a composition (wt. % ethylene content) with a difference of no greater than 20 wt. % (relative) and more preferably 10 wt. % (relative) of the average wt. % ethylene content of the whole first polymer component. The first polymer component is narrow in compositional distribution if it meets the fractionation test outlined above.

(B) In all FPC, the length and distribution of stereoregular propylene sequences is consistent with the substantially random statistical crystallizable copolymerization. It is well known that sequence length and distribution are related to the copolymerization reactivity ratios. By substantially random, we mean copolymer for which the product of the reactivity ratios is generally 2 or less. In stereoblock structures, the average length of PP sequences is greater than that of substantially random copolymers with a similar composition. Prior art polymers with stereoblock structure have a distribution of PP sequences consistent with these blocky structures rather than a random substantially statistical distribution. The reactivity ratios and sequence distribution of the polymer may be determined by C-13 NMR which locates the ethylene residues in relation to the neighboring propylene residues. To produce a crystallizable copolymer with the required randomness and narrow composition distribution, it is desirable to use (1) a single sited catalyst and (2) a well-mixed, continuous flow stirred tank polymerization reactor which allows only a single polymerization environment for substantially all of the polymer chains of the first polymer component.

(C) The FPC preferably has a single broad melting transition. This is determined by DSC. Typically a sample of the FPC will show secondary melting peaks adjacent to principal peak these are considered together as single melting point. The highest of these peaks is considered the melting point. These FPC polymers have a melting point of less than 105° C., preferably less than 100° C. and a heat of fusion of less than 45 J/g preferably less than 35 J/g, more preferably less than 25 J/g, and even more preferably less than 15 J/g as determined by DSC.

Generally, the FPC of the present invention has a melting point below the second polymer component of the blend between 105° C. and 0° C. Preferably, the melting point of FPC is between 90° C. and 20° C. Most preferably, according to one embodiment of the present invention, the melting point of the FPC of the composition of the present invention is between 70° C. and 25° C.

(D) The FPC of the present inventive composition comprises isotactically crystallizable alpha-olefin sequences, e.g., preferably propylene sequences (NMR). The crystallinity of the first polymer component is, preferably, according to one embodiment, from 1% to 65% of homoisotactic polypropylene, preferably between 3% to 30%, as measured by the heat of fusion of annealed samples of the polymer.

(E) The weight average molecular weight of the FPC can be between 10,000 to 5,000,000 preferably 80,000 to 500,000 with an poly dispersity index (PDI) between 1.5 to 40.0, more preferably between about 1.8 to 5 and most preferably between 1.8 to 3. It is preferred if the FPC has a ML (1+4)@125° C. less than 100, more preferably less than 75 and more preferably less than 60.

(F) The low levels of crystallinity in the FPC are obtained by incorporating from 5%–40% by weight alpha-olefin, preferably from 6%–30% by weight alpha-olefin, and most preferably, it comprises from 8%–25% by weight alpha-olefin and even more preferably between 8%–20%, most preferably between 10%–15% by weight alpha-olefin. These composition ranges for the FPC are dictated by the object of the present invention. Alpha olefins comprise one or more members of the group $C_2$, $C_3$–$C_{20}$ alpha-olefin. At alpha-olefin compositions lower than the above lower limits for the composition of the FPC, the blends of the SPC and FPC are thermoplastic and do not have the phase separated morphology required for the tensile recovery properties of the blends. At alpha-olefin compositions higher than the above higher limits for the FPC, the blends have poor tensile strength and a phase separated morphology with a coarse dispersion. It is believed, while not meant to be limited thereby, the FPC needs to have the optimum amount of isotactic polypropylene crystallinity to crystallize with the SPC for the beneficial effects of the present invention. As discussed above, the preferred alpha-olefin is ethylene.

(G) In a preferred embodiment, the blend composition from which a membrane according to this invention is formed contains 30% by weight or more of FPC, more preferably 35% by weight or more, even more preferably 40% by weight or more, most preferably 45% by weight or more.

Typically, the composition from which the membrane according to this invention is formed contains 100% by weight or less of PFC, more preferably 97% by weight or less, even more preferably 96% by weight or less, most preferably 95% by weight or more.

In blends containing the FPC2 the amount of the FPC2 is included in FPC fraction for the ratios of the relative amounts of crystalline and crystallizable polymer.

(H) More than one FPC may be used in a single blend with a SPC. Each of the FPC is described above and the number of FPC in this embodiment generally is less than three and more preferably, two. The different FPC differ in their crystallinity. The less crystalline portion is the FPC while the more crystalline portion is the FPC2. The FPC2 has, preferably, according to one embodiment, from 20%–65%, preferably between 25%–65% of the crystallinity of homoisotactic polypropylene as measured by the heat of fusion of annealed samples of the polymer. These FPC2 polymers have a melting point of less than 115° C. or preferably less than 100° C. and a heat of fusion of less than 75 J/g, preferably less than 70 J/g, more preferably less than 65 J/g, as determined by DSC. The heat of fusion of all samples, including the individual FPC components, is measured by DSC, according to procedures described herein.

The FPC and the FPC2 may also differ in their molecular weight. In this embodiment of the invention the FPC and FPC2 differ in the amount of alpha-olefin present in each, consistent with the formation of the FPC of different crystallinity content. The preferred alpha-olefin is ethylene. The resultant morphology consists of a finer dispersion of the highly crystalline component with the continuous phase of the less crystalline phase. Such a morphology leads to in the elastic recovery properties of the blends.

The first polymer component may also comprise a crystallizable copolymer of atactic propylene and isotactic propylene. Such crystallizable homopolymers of propylene have been described in U.S. Pat. No. 5,594,080. Optionally, the first polymer component of the composition of the present invention may comprise a diene.

Generally, without limiting in any way the scope of the invention, one means for carrying out a process of the present invention for the production of the crystallizable copolymer FPC is as follows: (1) propylene is introduced in a stirred-tank reactor, (2) the catalyst system is introduced via nozzles in either the vapor or liquid phase, (3) feed ethylene gas is introduced either into the vapor phase of the reactor, or sparged into the liquid phase as is well known in the art, (4) the reactor contains a liquid phase composed substantially of propylene, together with dissolved alpha-olefin, preferably ethylene, and a vapor phase containing vapors of all monomers, (5) the reactor temperature and pressure may be controlled via reflux of vaporizing propylene (autorefrigeration), as well as by cooling coils, jackets, etc., (6) the polymerization rate is controlled by the concentration of catalyst, temperature, and (7) the ethylene (or other alpha-olefin) content of the polymer product is determined by the ratio of ethylene to propylene in the reactor, which is controlled by manipulating the relative feed rates of these components to the reactor.

For example, a typical polymerization process comprises a polymerization in the presence of a catalyst comprising a chiral bis (cyclopentadienyl) metal compound and either 1) a non-coordinating compatible anion activator, or 2) an alumoxane activator. An exemplary catalyst system is described in U.S. Pat. No. 5,198,401 which is herein incorporated by reference for purposes of U.S. practice. The alumoxane activator is preferably utilized in an amount to provide a molar aluminum to metallocene ratio of from 1:1 to 20,000:1 or more. The non-coordinating compatible anion activator is preferably utilized in an amount to provide a molar ratio of biscyclopentadienyl metal compound to non-coordinating anion of 10:1 to 1:1. The above polymerization reaction is conducted by reacting such monomers in the presence of such catalyst system at a temperature of from −50° C. to 200° C. for a time of from 1 second to 10 hours to produce a copolymer.

While the process of embodiments of the present invention includes utilizing a catalyst system in the liquid phase (slurry, solution, suspension or bulk phase or combination thereof), gas phase polymerization can also be utilized. When utilized in a gas phase, slurry phase or suspension phase polymerization, the catalyst systems will preferably be supported catalyst systems. See, for example, U.S. Pat. No. 5,057,475 which is incorporated herein by reference for purposes of U.S. practice. Such catalyst systems can also include other well known additives such as, for example, scavengers. See, for example, U.S. Pat. No. 5,153,157 which is incorporated herein by reference for purposes of U.S. practice. These processes may be employed without limitation of the type of reaction vessels and the mode of conducting the polymerization. As stated above, and while it is also true for systems utilizing a supported catalyst system, the liquid phase process comprises the steps of contacting ethylene and propylene with the catalyst system in a suitable polymerization diluent and reacting the monomers in the presence of the catalyst system for a time and at a temperature sufficient to produce an ethylene-propylene crystallizable copolymer of the desired molecular weight and composition.

These stereoregular propylene sequences of FPC and FPC2 should match the stereoregularity of the propylene in the second polymer component (SPC). For example, if the SPC is predominately isotactic polypropylene, then the FPC, and FPC2 if used, is crystallizable copolymer having isotactic propylene sequences. If the SPC is predominately syndiotactic polypropylene, then the FPC, and the FPC2 if used, is a crystallizable copolymer having syndiotactic sequences. It is believed that this matching of stereoregularity increases the compatibility of the components results in improved adhesion of the domains of the polymers of different crystallinities in the polymer blend composition. Furthermore, good compatibility is only achieved in a narrow range of crystallizable copolymer composition for the FPC. Narrow intermolecular and intramolecular compositional distribution in the crystallizable copolymer is preferred. The aforementioned characteristics of the FPC, and FPC2 if used, are preferably achieved by polymerization with a chiral metallocene catalyst.

The FPC is made with a polymerization catalyst which forms essentially or substantially isotactic polypropylene. When all or substantially all propylene sequences in the SPC are isotactic. Nonetheless, the polymerization catalyst used for the formation of FPC will introduce stereo- and regio-errors in the incorporation of propylene. Stereo errors are those where the propylene inserts in the chain with a tacticity that is not isotactic. A regio error in one where the propylene inserts with the methylene group or the methyldiene group adjacent to a similar group in the propylene inserted immediately prior to it. Such errors are more prevalent after the introduction of an ethylene in the FPC. Thus the fraction of propylene in isotactic stereoregular sequences (e.g. triads or pentads) is less than 1 for FPC and decreases with increasing ethylene content of the FPC. While not wanting to be constrained by this theory, we suggest that the introduction of these errors in the introduction of propylene particularly in the presence of increasing amounts of ethylene are important in the use of these ethylene propylene copolymers as the FPC. Notwithstanding the presence of these errors the FPC is statistically random in the distribution of ethylene.

Preferably the FPC is a random crystallizable copolymer of ethylene and propylene having an average content by weight of at least 60% units derived from propylene and more preferably at least 75%.

According to another embodiment of the present invention, the first polymer component (both FPC and FPC2) may contain small quantities of a non-conjugated diene to aid in the vulcanization and other chemical modification of the blend of the first polymer component and the second polymer component. The amount of diene is preferably less than 10 wt. % and preferably less than 5 wt %. The diene may be selected from the group consisting of those which are used for the vulcanization of ethylene propylene rubbers and preferably ethylidene norbornene, vinyl norbornene and dicyclopentadiene.

The FPC2, if used, has the same characteristics as the FPC described above. The FPC2 has a crystallinity and composition intermediate between the SPC and the FPC. In the preferred case where the FPC2 is a crystallizable copolymer of ethylene and propylene while the SPC is homopolymer of propylene. The FPC2 has the same type of crystallinity of propylene as in SPC and FPC and an ethylene content in between SPC and FPC. If both SPC and FPC are composed of propylene of different levels of crystallinity the FPC2 is a propylene polymer with level of crystallinity intermediate between SPC and FPC. The relative amounts of FPC and FPC2 can vary between 95:5 to 50:50 in the blend. The ratio of the SPC to the sum of FPC and FPC2 may vary in the range of 1:99 to 95:5 by weight and more preferably in the range 2:98 to 70:30 by weight.

The present invention is directed to thermoplastic membranes made from a FPC which is a crystallizable copolymer of a $C_2$, $C_3$–$C_{20}$ alpha-olefin (preferably ethylene). Exemplary alpha-olefins may be selected from the group consisting of ethylene; butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1. Thermoplastic membranes having a heterophase morphology are made when blends of FPC and SPC where the where the SPC is predominately crystalline stereoregular polypropylene. Optional components of the blend are FPC2, a crystallizable copolymer of a $C_2$, $C_3$–$C_{20}$ alpha-olefin (preferably ethylene) and process oil. The invention includes the process for the formation of formation of thermoplastic membranes from blends Other optional components are fillers, colorants, antioxidants, nucleators and flow improvers.

The Second Polymer Component (SPC)

In accordance with the present invention, the SPC component i.e., the polypropylene polymer component may be homopolypropylene, or a copolymer of propylene, or mixtures thereof. These mixtures are commonly known as reactor copolymer (RCP) or impact copolymer (ICP). The SPC has the following characteristics.

The polypropylene of the present invention is predominately crystalline, i.e., it has a melting point generally greater than 110° C., preferably greater than 115° C., and most preferably greater than 130° C. It has a heat of fusion greater than 60 J/g preferably at least 70 J/g, more preferably at least 80 J/g, as determined by DSC analysis. Determination of this heat of fusion is influenced by treatment of samples. If treated as discussed below herein, the heat of fusion of this SPC will be a maximum of about 88 J/g.

The polypropylene can vary widely in composition. For example, substantially isotactic polypropylene homopolymer or propylene copolymer containing equal to or less than 10 weight percent of other monomer, i.e., at least 90% by weight propylene can be used. Further, the polypropylene can be present in the form of a graft or block copolymer, in which the blocks of polypropylene have substantially the same stereoregularity as the propylene-alpha-olefin copolymer so long as the graft or block copolymer has a sharp melting point above 110° C. and preferably above 115° C. and more preferably above 130° C., characteristic of the stereoregular propylene sequences. The propylene polymer component may be a combination of homopolypropylene, and/or random, and/or block copolymers as described herein. When the above propylene polymer component is a random copolymer, the percentage of the copolymerized alpha-olefin in the copolymer is, in general, up to 9% by weight, preferably 2% to 8% by weight, most preferably 2% to 6% by weight. The preferred alpha-olefins contain 2 or from 4 to 12 carbon atoms. The most preferred alpha-olefin is ethylene. One, or two or more alpha-olefins can be copolymerized with propylene.

Exemplary alpha-olefins may be selected from the group such as those disclosed above for the FPC.

The molecular weight of the SPC can be between 10,000 to 5,000,000, preferably 50,000 to 500,000 with a poly dispersity index (PDI) between 1.5 to 40.0.

The thermoplastic polymer blend compositions of the present invention may comprise from 0%–95% by weight of SPC.

In a preferred embodiment, the blend composition from which a membrane according to this invention is formred contains 1% by weight or more of SPC, more preferably 2% by weight or more, even more preferably 3% by weight or more, most preferably 4% by weight or more.

Typically, the composition from which the membrane, according to this invention is formed contains 40% by weight or less of SPC, more preferably 35% by weight or less, even more preferably 30% by weight or less, most preferably 25% by weight or more.

There is no particular limitation on the method for preparing this propylene polymer component of the invention. However, in general, the polymer is a propylene homopolymer obtained by homopolymerization of propylene in a single stage or multiple stage reactor. Copolymers may be obtained by copolymerizing propylene and an alpha-olefin having 2 or from 4 to 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable.

The SPC may also be comprised of commonly available isotactic polypropylene compositions referred to as impact copolymer or reactor copolymer. However these variations in the identity of the SPC are acceptable in the blend only to the extent that all of the components of the SPC are substantially similar in composition and the SPC is within the limitations of the crystallinity and melting point indicated above. This SPC may also contain additives such as flow improvers, nucleators and antioxidants which are normally added to isotactic polypropylene to improve or retain properties. All of these polymers are referred to as the SPC.

Process Oil

Process oil can be optimally added to the polymer blend compositions of the present invention. The addition of process oil in moderate amounts lowers the viscosity and flexibility of the blend while improving the properties of the blend at temperatures near and below 0° C. It is believed that these benefits arise by the lowering of the Tg of the blend comprising the mixture of the SPC and the FPC. Additional benefits of adding process oil to the blend of the SPC and the FPC include improved processibilty and a better balance of elastic and tensile strength are anticipated.

The process oil is typically known as extender oil in the rubber application practice. The process oils can consist of (a) hydrocarbons consisting of essentially of carbon and hydrogen with traces of hetero atoms such as oxygen or (b) essentially of carbon, hydrogen and at least one hetero atom such as dioctyl phthalate, ethers and polyethers. The process oils have a boiling point to be substantially involatile at 200° C. These process oils are commonly available either as neat solids or liquids or as physically absorbed mixtures of these materials on an inert support (e.g. clays, silica) to form a free flowing powder. We believe that all forms of these process oils are equally applicable to the description and the practice of the invention.

The process oils usually include a mixture of a large number of chemical compounds which may consist of linear, acyclic but branched, cyclic and aromatic carbonaceous structures. Another family of process oils are certain low to medium molecular weight (Molecular weight ($M_n$)<10,000) organic esters and alkyl ether esters. It is also anticipated that combinations of process oils each of which is described above may be used in the practice of the invention. It is important that in the selection of the process oil be compatible or miscible with the polymer blend composition of the SPC and the FPC in the melt to form a homogenous one phase blend. It is also preferred if the process oil is substantially miscible in the FPC at room temperature.

The addition of the process oils to the mixture comprising the SPC and the FPC maybe made by any of the conventional means known to the art. These include the addition of all or part of the process oil prior to recovery of the polymer as well as addition of the process oil, in whole or in part, to the polymer as a part of a compounding for the interblending of the SPC and the FPC. The compounding step may be carried out in a batch mixer such as a mill or a internal mixer such as Banbury mixer. The compounding operation may also be conducted in a continues process such as a twin screw extruder.

The addition of certain process oils to lower the glass transition temperature of blends of isotactic polypropylene and ethylene propylene diene rubber has been described in the art in U.S. Pat. Nos. 5,290,886 and 5,397,832. We expect these procedures are easily applicable to the SPC and FPC mixtures of the current invention.

In a preferred embodiment, the blend composition from which a membrane according to this invention is formed contains 1% by weight or more of process oil, more preferably 2% by weight or more, even more preferably 3% by weight or more, most preferably 4% by weight or more.

Typically, the composition from which the membrane according to this invention is formed contains 25% by weight or less of process oil, more preferably 22% by weight or less, even more preferably 19% by weight or less, most preferably 16% by weight or less.

Inorganic Fillers

The thermoplastic membrane compounds of the instant invention preferably contain inorganic particulate fillers. The inorganic particulate fillers are used to improve the mechanical and wear properties of the compound of the instant invention. Typically less than 40 wt %, more preferably less than 30 wt % of the inorganic filler is used in these formulations. The particulate fillers include particles less than 1 mm in diameter, rod less than 1 cm in length and plates less than 0.2 sq. cm. in surface area. Exemplary particulate fillers include carbon black, clays, titanium and magnesium oxides and silica. In addition, other particulate fillers such as calcium carbonate, zinc oxide, whiting, magnesium oxide can also be used. Examples of rod like filler are glass fibers. Examples of plate like fillers are mica. The addition of very small particulate fillers, commonly referred to as nanocomposites, is also contemplated in this invention.

In a preferred embodiment, the blend composition from which a membrane according to this invention is formed contains 1% by weight or more of particulate filler, more preferably 2% by weight or more, even more preferably 3% by weight or more, most preferably 4% by weight or more.

Typically, the composition from which the membrane according to this invention is formed contains 40% by weight or less of particulate filler, more preferably 35% by weight or less, even more preferably 30% by weight or less, most preferably 25% by weight or less.

The addition of the fillers does change the properties of the compound of the instant invention. In particular, compounds with the inorganic filler have improved thermal stability and resistance to wear. In addition the addition of white fillers improve the temperature changes of the hydrocarbon polymers on exposure to sunlight. However the addition of fillers, beyond a certain level, does lead to a dramatic increase in the viscosity and a corresponding decrease in the processability. This threshold level is the percolation threshold. In addition to the m increase in the viscosity the percolation threshold is also accompanied by an improvement in the elastic properties and at slightly higher levels of the filler above the percolation threshold a drop in the elastic recovery of the blend. The percolation threshold is attained at different levels of addition of fillers depending on the type of filler used. With in any one family of filler (e.g. carbon black) the percolation threshold is attained at lower levels than for the fillers with a smaller size than the for the fillers with a larger size. It is important for the compounding of the blends of the instant invention to reach a filler level which is slightly lower than the percolation threshold such that while the beneficial properties of the fillers addition are retained the effect of addition of filler beyond the percolation threshold on the processability and the elasticity of the blend are avoided. In this embodiment of the invention we show in examples the data for the percolation threshold and the rise in viscosity for a variety of commonly used fillers.

The Blend of First and Second Polymer Components

The blends of SPC and FPC and other components may be prepared by any procedure that guarantees an intimate mixture of the components. For example, the components can be combined by melt pressing the components together on a Carver press to a thickness of 0.5 millimeter (20 mils) and a temperature of 180° C., rolling up the resulting slab, folding the ends together, and repeating the pressing, rolling, and folding operation 10 times. Internal mixers are particularly useful for solution or melt blending. Blending at a temperature of 180° C. to 240° C. in a Brabender Plastograph for 1 to 20 minutes has been found satisfactory. Still another method that may be used for admixing the components involves blending the polymers in a Banbury internal mixer above the flux temperature of all of the components, e.g., 180° C. for 5 minutes. A complete mixture of the polymeric components is indicated by the uniformity of the morphology of the dispersion of SPC and FPC. Continuous mixing may also be used. These processes are well known in the art and include single and twin screw mixing extruders, static mixers for mixing molten polymer streams of low viscosity, impingement mixers, as well as other machines and processes, designed to disperse the first polymer component and the second polymer component in intimate contact.

The polymer blends of the instant invention exhibit a remarkable combination of desirable physical properties. The incorporation of as little as 5% SPC in the FPC, increases the melting point of the blend. In addition, the incorporation of SPC in accordance with the instant invention nearly eliminates the stickiness characteristic of the propylene/alpha-olefin crystallizable copolymer alone.

The mechanism by which the desirable characteristics of the present copolymer blends are obtained is not fully understood. However, it is believed to involve a co-crystallization phenomenon between propylene sequences of similar stereoregularity in the various polymeric components, which results in a merging of the crystallization temperature of the latent components. Applicants do not wish to be bound by this theory. The combined first polymer component and second polymer component have a blend melting point closer together than would be expected on a comparison of the properties of the individual components alone. Surprisingly, some blend compositions have a single crystallization temperature and a single melting temperature, since it would be expected by those skilled in the art that blending a crystalline polymer and a crystallizable polymer would result in a double crystallization temperature as well as a double melting temperature reflecting the two polymeric components. However, the intimate blending of the polymers having the required crystallinity characteristics apparently results in a crystallization phenomenon that modifies the other physical properties of the propylene/alpha-olefin crystallizable copolymer, thus measurably increasing its commercial utility and range of applications.

While the above discussion has been limited to the description of the invention in relation to having only components one and two (e.g. FPC and SPC), as will be evident to those skilled in the art, the polymer blend compositions of the present invention may comprise other additives. Various additives may be present to enhance a specific property or may be present as a result of processing of the individual components. Additives which may be incorporated include, for example, fire retardants, antioxidants, plasticizers, pigments, vulcanizing or curative agents, vulcanizing or curative accelerators, cure retarders, processing aids, flame retardants, tackifying resins, and the like. These compounds may include fillers and/or reinforcing materials. These include carbon black, clay, talc, calcium carbonate, mica, silica, silicate, combinations thereof, and the like. Other additives which may be employed to enhance properties include antiblocking agents, and a coloring agent. Lubricants, mold release agents, nucleating agents, reinforcements, and fillers (including granular, fibrous, or powder-like) may also be employed. Nucleating agents and fillers tend to improve rigidity of the article. The list described herein is not intended to be inclusive of all types of additives which may be employed with the present invention. Upon reading this disclosure, those of skill in the art will appreciate other additives may be employed to enhance properties of the composition. As is understood by the skilled in the art, the polymer blend compositions of the present invention may be modified to adjust the characteristics of the blend as desired.

Morphology of the Blend

It is important to note that the morphology of the inventive blends differs markedly from the morphology of both thermoplastic elastomers (TPE) and thermoplastic olefins (TPO), both terms well known to those of ordinary skill in this art. Specifically, both TPEs and TPOs show continuous phases of crystalline morphology, with discontinuous phase of amorphous phase. By contrast, the inventive blends show the reverse, a continuous phase of amorphous or crystallizable morphology, and a discontinuous phase of the crystalline morphology.

The morphology of the blend is shown in Transmission Electron Microscopy of the blends. In this procedure samples were exposed to vapors of 1% aqueous $RuO_4$ for 3 days. The $RuO_4$ penetrates the amorphous zones of the continuous, less crystalline phase of the polymer while the more crystalline domains composed largely of the SPC are essentially unaffected. Within the continuous zone the $RuO_4$ stained the microzones of amorphous polymer while the lamellae of crystalline polymer are visible by contrast. The blend was cryomicrotomed at −196° C. to thin sections approximately 0.3 to 3 µm thick. Several sections were analyzed for each sample until a section was found where the crystalline domains was unstained while the continuous phase was stained to distinguish it from the dispersed phase and to observe the microstructure of the lamellae of polymer.

Figure 2:
FIG. 2 shows a different blend of the invention, containing 78% of another FPC of a different composition.
Figure 3:
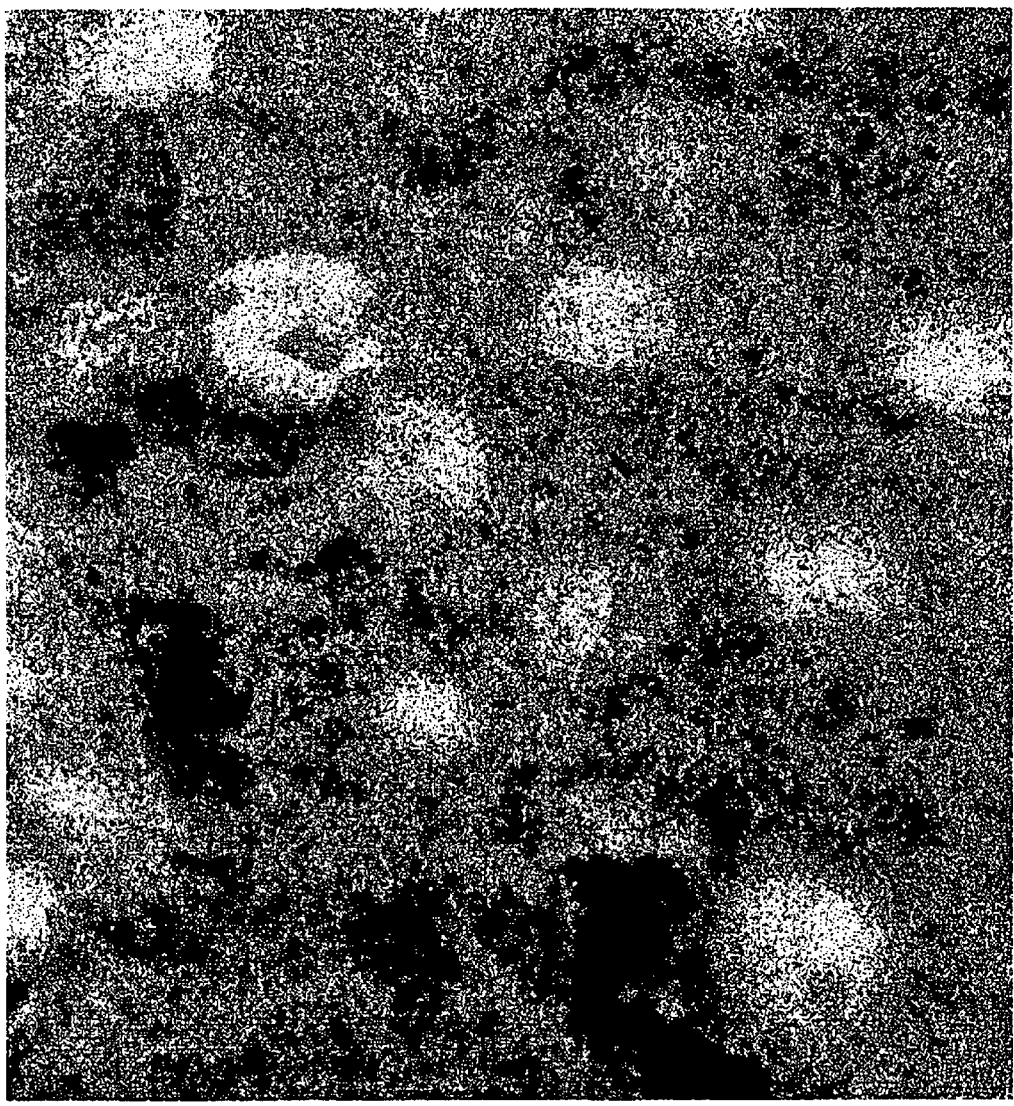
FIG. 3 illustrates the addition of FPC2 to the blend of FIG. 2.

The blends of the current invention had a microstructure with clearly dispersed microdomains of the crystalline phase. This is shown in FIG. 1. The composition of the blend is 78% of FPC and the balance of SPC. The domains are elongated with approximate dimensions of 0.2 µm×1 µm. The addition of FPC2 to this blend is shown in the micrograph FIG. 2. It shows the reduction in the size of the dispersed phase.

Membrane Preparation

Thermoplastic membranes of the blend for purposes of exemplification were made as by compression molding using a spacer to obtain the appropriate thickness. A 65 g sample of the blend is compression molded at 180° C. to 200° C. for 15 minutes at a force of 25 tons into a plaque of dimensions of 8 in×8 in. The membrane is compression molded between sheets of Teflon® covered aluminum foil for 8 minutes and cooled under compression to room temperature for 5 minutes prior to removal. A metal spacer with thickness of $^{50}/_{1000}$ inch is used to ensure uniform thickness across the membrane. The membrane averaged 55 to $^{60}/_{1000}$ of inch thick. The membranes are annealed for 5–15 days at room temperature prior to testing for properties.

Orientation and Annealing

Another part of the invention is that the mechanical properties referred to above can be enhanced by the mechanical orientation of the membrane. Mechanical orientation can be done by the temporary, forced extension of the polymer membrane along one or more axis for a short period of time before it is allowed to relax in the absence of the extensional forces. It is believed that the mechanical orientation of the polymer leads to reorientation of the crystallizable portions of the blend of the first and the second polymer. Oriented polymer membranes are conducted by maintaining the polymer membranes or the articles made from a such a blend at an extension of 10% to 400% for a period of 0.1 seconds to 24 hours. A typical orientation is an extension of 200% for a momentary period (generally less than 1 minute) at room temperature.

Annealing and orientation of the blend of the SPC and FPC lead to improvement in the tensile strength and recovery properties of the blend. This is shown in the data in Tables below where the set recovery values for the blends described in the invention are described for the blends as made, after annealing and after orientation as described in the procedures above. The data show that the elastic recovery properties are enhanced after one or both of these treatments.

Orientation of the membrane may be carried out in the machine direction (MD) or the transverse direction (TD) or both directions (biaxially) using conventional equipment and processes.

Properties of the Thermoplastic Membrane

The thermoplastic membranes of the present invention are polyolefin blends containing inorganic fillers and plasticizing process oil. These membranes can be used for a variety of applications such as barriers to fluids, roof sheeting, geological membranes as well as liners for irrigation channels and reservoirs. These intended uses of the membranes require the simultaneous generation of number of properties in these materials.

These key properties are tensile elongation, tensile strength, shore hardness, softening point, self tack on adhesion, MFR (measured at 230° C.), tension set, and glass transition temperature.

In one embodiment, tensile elongation is preferably greater than 100%, more preferably greater than 300% and most preferably greater than 500%.

In another embodiment, tensile strength is preferably greater than 5 MPa, more preferably greater than 10 MPa, more preferably greater than 13 MPa.

In yet another embodiment, shore hardness should be less than 100 Shore A, preferably less than 80 Shore A, more preferably less than 60 Shore A.

In yet another embodiment, the softening point should be greater than 45° C., preferably greater than 60° C., most preferably greater than 80° C.

In yet another embodiment, the self tack on adhesion should be greater than 5 KN/m$^2$, more preferably greater than 10 kN/m$^2$.

In yet another embodiment, tension set of the oriented sheet of the thermoplastic membrane is less than 10%.

In yet another embodiment, the MFR (measured at 230° C.) is greater than 1.0.

Meeting both the tension set and MFR specifications as set forth above immediately distinguishes this thermoplastic membrane as being both elastic, in the sense that it does not undergo permanent deformation on being temporarily distended while still being processible on conventional plastics processing machinery.

Glass transition temperature of the membranes of this invention are maintained substantially below 0° C.

In other embodiments, membranes will meet 2, 3, 4, 5, 6, 7, or all of the above listed criteria. The more of these criteria that are met, the greater will be the utility of the membrane.

The ingredients of the compound used for the thermoplastic membrane collectively produce the properties of the final compound. The ratio of ingredients used for the inventions of the instant description can be varied only within certain limits since beyond these limits some or all of the properties are values beyond these critical and desirable targets. The table below, Table A, is illustrative of the dependency of the properties of the thermoplastic membrane outlined above to the composition of the membrane.

TABLE A

MEMBRANE BLEND COMPONENTS VS. PROPERTIES

| Increase in component | Elongation | Tensile strength | Shore Hardness | Softening Point | Self Tack | Set | MFR |
|---|---|---|---|---|---|---|---|
| FPC | = | − | − | = | + | + | = |
| SPC | − | + | + | + | − | − | = |
| Filler | − | + | + | = | − | − | − |
| Plasticizer | − | − | − | − | + | − | + |

The use of the FCP which is a copolymer of propylene and ethylene or an alpha olefin less than ten carbon atoms ensures that the glass transition temperature of the thermoplastic membrane is substantially below 0° C. Further, the use of substantially fully saturated polyolefin for both the SCP and the FCP ensures that the effects of long term exposure to the environment are minimal.

Hardness in Relation to Other Physical Properties

Among the benefits of the above invention is that compositions comprising the SPC and the FPC containing optional amounts of process oil and fillers can be made which have excellent self tack and low hardness with little of no degradation of the other properties listed above. Table 4 and 5 shows the experimental data obtained for membranes of the inventive composition which have the inventive elastic recovery properties. Tension set is typically below 25% and more typically less than 15%.

The membranes made from the blends described herein will exhibit excellent, low hardness and simultaneously excellent tensile strength, tack and tear strength. Specifically, the tensile strength, tack and hardness will be described by equations derived from plotting the data shown in Tables 4 and 5 and in a plot versus Shore hardness. Preferred membranes of the invention will have tensile strength, tear strength, and tack according to the following equations:

tensile strength$\geq$0.1×(Shore A hardness-60)+2 tear strength (Die C)$\geq$Shore A hardness-60 tack$\geq$0.25×(Shore A hardness-60)

More preferably:

tensile strength$\geq$0.33×(Shore A hardness-60)+2 tear strength (Die C)$\geq$2×(Shore A hardness-60)

tack$\geq$(Shore A hardness-60)

Even more preferably:

tensile strength$\geq$0.533×(Shore A hardness-60)+2 tear strength (Die C)$\geq$4×(Shore A hardness-60)

tack$\geq$2.66×(Shore A hardness-60)

In yet other embodiments, the tension set of the membrane, after momentary orientation to 200% elongation, is less than 20%, more preferably less than 15%, and most preferably less than 10%.

In yet other embodiments, the MFR of the blend composition from which the membrane is formed is greater than or equal to 1 g/10 min.

Preferred membranes according to this invention will simultaneously possess a combination of 2 or more different preferred properties selected from the above descriptions of tensile and tear strength, tack, tension set, and MFR.

Even more preferred membranes according to this invention will simultaneously possess a combination of 3 or more different preferred properties selected from the above descriptions of tensile and tear strength, tack, tension set, and MFR.

Most preferred membranes according to this invention will simultaneously possess a combination of all of the above descriptions of tensile and tear strength, tack, tension set, and MFR.

These values of the tensile strength and tear over the range of composition of the SPC and FPC are dependent on the amount of filler and process oil added to the polymer. In general thermoplastic membranes of the present invention should have a low hardness in order to have a soft membrane combined with a extended temperature and aging range over which the values of tensile strength and tear are essentially retained. This is shown in the Tables where for a selected group of the inventive membranes data is shown for the performance at 70° C. and after aging for an extended period of time. Some comparative blends in the prior art can be compounded to have some of these properties but fail because they have very high viscosities. The blends of the current invention have better elastic recovery, as indicated by low set, than comparative blends at comparable 200% extension. These properties are available over a wide range of composition and relative amounts of the SPC and the FPC. In the examples shown below we show examples of numerous blends of composition of the SPC and the FPC which have the above favorable combination of properties.

It is possible to generate comparative polymer blends with some aspect of the combined load and set properties of the blends of this invention approached if the FPCs are of extremely high molecular weight and in the limit crosslinked. Such a combination would lead to blends which had very poor processing characteristics since they would tend to melt fracture. It is understood that polymer blends of embodiments of the present invention are directed to easy processing materials which can be handled in conventional thermoplastics processing machinery.

Another part of the invention is that the elastic recovery referred above can be enhanced by the thermal annealing of the polymer membranes or by the orientation of articles made from these polymer membranes. Thermal annealing of the polymer blend is conducted by maintaining the polymer blends or the articles made from a such a blend at temperature between room temperature to a maximum of 160° C. or more preferably to a maximum of 130° C. for a period between 5 minutes to less than 7 days. A typical annealing period is 3 days at 50° C. or 5 minutes at 100° C. The annealing time and temperature can be adjusted for any particular blend composition comprising a SPC and one or two FPC by experimentation. It is believed that during this annealing process there are intermolecular rearrangement of the polymer chains leading to a material with much greater recovery from tensile deformation than the unannealed material.

Determination of Properties

As used herein, Mooney Viscosity was measured as ML (1+4) at 125° C. in Mooney units according to ASTM D1646.

The composition of ethylene propylene copolymers, which are used as comparative examples, was measured as ethylene wt. % according to ASTM D 3900.

The composition of the first polymer component was measured as ethylene wt. % according to the following technique. A thin homogeneous membrane of the second polymer component, pressed at a temperature of or greater than 150° C. was mounted on a Perkin Elmer PE 1760 infra red spectrophotometer. A full spectrum of the sample from 600 cm−1 to 400 cm−1 was recorded and the ethylene wt. % of the second polymer component was calculated according to Equation 1 as follows:

ethylene wt. %=82.585−111.987$X$+30.045$X^2$ wherein X is the ratio of the peak height at 1155 cm$^{-1}$ and peak height at either 722 cm$^{-1}$ or 732 cm$^{-1}$, which ever is higher.

Techniques for determining the molecular weight (Mn and Mw) and molecular weight distribution (MWD) are found in U.S. Pat. No. 4,540,753 (which is incorporated by reference herein for purposes of U.S. practice) and references cited therein and in Macromolecules, 1988, volume 21, p 3360 (which is herein incorporated by reference for purposes of U.S. practice) and references cited therein.

The procedure for Differential Scanning Calorimetry (DSC) is described as follows. About 6 to 10 mg of a sheet of the polymer pressed at approximately 200° C. to 230° C. is removed with a punch die. This is annealed at room temperature for 240 hours. At the end of this period, the sample is placed in a Differential Scanning Calorimeter (Perkin Elmer 7 Series Thermal Analysis System) and cooled to about −50° C. to −70° C. The sample is heated at 20° C./min to attain a final temperature of 200° C. to 220° C. The thermal output is recorded as the area under the melting peak of the sample which is typically peaked at 30° C. to 175° C. and occurs between the temperatures of 0° C. and 200° C. is measured in Joules as a measure of the heat of fusion. The melting point is recorded as the temperature of the greatest heat absorption within the range of melting of the sample. Under these conditions, the melting point of the second polymer component and the heat of fusion is lower than the first polymer component as outlined in the description above.

Composition distribution of the second polymer component was measured as described below. About 30 gms of the second polymer component was cut into small cubes ⅛" on the side. This is introduced into a thick walled glass bottle closed with screw cap along with 50 mg of Irganox1076, an antioxidant commercially available from Ciba-Geigy Corporation. Then, 425 ml of hexane (a principal mixture of normal and iso isomers) is added to the contents of the bottle and the sealed bottle is maintained at 23° C. for 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 ml and the bottle is maintained at 31° C. for 24 hours in a covered circulating water bath. The soluble polymer is decanted and the additional amount of hexane is added for another 24 hours at 31° C. prior to decanting. In this manner, fractions of the second polymer component soluble at 40° C., 48° C., 55° C. and 62° C. are obtained at temperature increases of approximately 8° C. between stages. Further, increases in temperature to 95° C. can be accommodated, if heptane, instead of hexane, is used as the solvent for all temperatures above 60° C. The soluble polymers are dried, weighed and analyzed for composition, as wt. % ethylene content, by the IR technique described above. Soluble fractions obtained in the adjacent temperature increases are the adjacent fractions in the specification above.

Data was obtained with Escorene™ 4292 (1.5 MFR, homo-isotactic polypropylene) and with Escorene™ 9272 (2.8 MFR, 5% ethylene reactor copolymer polypropylene) which is sold by the Exxon Mobil Chemical Company, Houston, Tex. Data in Tables 4, 5, and 6 was obtained with FPC-6 in Table 1.

Blends were made by mixing a total of 72 g of all components, including the first polymer component, the second polymer component, the optional amounts of process oil and other ingredients in a Brabender intensive mixture for 3 minutes at a temperature controlled to be within 185° C. and 220° C. High shear roller blades were used for the mixing and approximately 0.4 g of Irganox-1076, an antioxidant available from the Novartis Corporation, was added to the blend. Samples were aged by allowing them to stand at room temperature prior to testing. Samples were aged for 5, 10, 15, 20 and 25 days prior to testing on the Instron. Significant difference in the tensile strength and tension set were observed between samples aged 1 days versus those aged for 5 or more days. There was no experimental difference between samples aged 5 days or longer.

Samples were oriented by momentarily extending them to 200% extension at room temperature. These oriented samples were retested under tensile testing conditions outlined above.

Flexural modulus was determined for samples of the blend by ASTM procedure D790 at room temperature.

Data analysis and mathematical model generation was done on Microsoft Excel. The invention, while not meant to be limited thereby, is further illustrated by the following specific examples: Peel adhesion testing is performed as follows: a smooth sheet of the compound is formed from a compression molded membrane to a thickness of 1.25 mm to 1.30 mm. When the stock or compound is smooth and free of bubbles, it is removed from the roll. The compound is laid roll-side down on Mylar® sheet or film. The sample is brought to a constant temperature of between 70° F. to 77° F. (21 to 25° C.) and 50 percent plus or minus 5 percent relative humidity. The compound is allowed to rest at these temperatures for a minimum of 1 hour before die cutting to dimensions of 2.5 cm by 15.25 cm by 1.27 cm. On an Instron®, the jaw separation is adjusted to about 1.9 cm and the cross-head speed is set to 1.27 meters per minute. The instrument is adjusted to zero and then calibrated on 100 range to full scale reading. The die cut samples are plied two at a time each having the dimensions 53 cm×15.2 cm×1.27 cm together with a piece of Mylar® inserted between the plies to create a tab. The sample is rolled six times with a 2.2 kg roller and the sample is put into the jaws of the Instron instrument. The low, high, and weighted average of the adhesion values are noted.

MFR is measured according to ASTM D1238 Condition L. Tear strength (Die C) is measured according to ASTM D412.

Tension Set is measured according to the following procedure. Test specimens of the required dumbbell geometry were removed from a compression molded pad and evaluated on an Instron 4465 tester equipped with Instron Series IX Software for Windows to produce the mechanical deformation data. The Instron Tester and associated equipment is available form The Instron Corporation in Canton, Mass. The testing was done at a travel rate of 20"/min. Samples were oriented by momentarily extending them to 200% extension at room temperature and then allowed to relax for 24 hours. These oriented samples were retested under tensile testing conditions outlined above. Tension set was determined on the samples of the blend which has been extended on the Instron to 200% extension and then allowed to relax. The samples were removed and the length (L2) of the deformation zone, between the grips on the Instron, was measured after 10 minutes. The original distance between the rips was the original length (L1) of the deformation zone. The tension set is given by the formula Tension set=100*($L2$–$L1$)/$L1$

EXAMPLES

Example 1

Ethylene/propylene Copolymerization to Form the First Polymer Component

Continuous Polymerization of the FPC was conducted in a 9 liter Continuous Flow Stirred Tank Reactor using hexane as the solvent. The liquid full reactor had a residence time of 9 minutes and the pressure was maintained at 700 kpa. A mixed feed of Hexane, ethylene and propylene was pre-chilled to approximately −30° C. to remove the heat of polymerization, before entering the reactor. Solution of catalyst/activator in Toluene and the scavenger in hexane were separately and continuously admitted into the reactor to initiate the polymerization. The reactor temperature was maintained between 35 and 50° C., depending on the target molecular weight. The feed temperature was varied, depending on the polymerization rate to maintain a constant reactor temperature. The polymerization rate was varied from 0.5 Kg/hr to 4 Kg/hr.

Hexane at 30 Kg/hr was mixed with ethylene at 717 g/hr and propylene at 5.14 Kg/hr and fed to the reactor. The polymerization catalyst, dimethyl silyl bridged bis-indenyl Hafnium dimethyl activated 1:1 molar ratio with N',N'-Dimethyl anilinium-tetrakis(pentafluorophenyl)borate was introduced at the rate of at 0.0135 g/hr. A dilute solution of triisobutyl aluminum was introduced into the reactor as a scavenger of catalyst terminators: a rate of approximately 111 mole of scavenger per mole of catalyst was adequate for this polymerization. After five residence times of steady polymerization, a representative sample of the polymer produced in this polymerization was collected. The solution of the polymer was withdrawn from the top, and then steam distilled to isolate the polymer. The polymerization rate was measured at 3.7 Kg/hr. The polymer produced in this polymerization had an ethylene content of 14%, ML (1+4) 125° C. of 13.1 and had isotactic propylene sequences.

Variations in the composition of the polymer were obtained principally by changing the ratio of ethylene to propylene. Molecular weight of the polymer was varied by either changing the reactor temperature or by changing the ratio of total monomer feed rate to the polymerization rate. Dienes for terpolymerization were added to the mixed feed stream entering the reactor by preparing the diene in a hexane solution and metering it in the required volumetric amount.

Example 2

Comparative Ethylene/propylene Polymerization Where the Propylene Residues are Atactic Polymerizations were conducted in a 1 liter thermostatted continuous feed stirred tank reactor using hexane as the solvent. The polymerization reactor was full of liquid. The residence time in the reactor was typically 7–9 minutes and the pressure was maintained at 400 kpa. Hexane, ethene and propene were metered into a single stream and cooled before introduction into the bottom of the reactor. Solutions of all reactants and polymerization catalysts were introduced continuously into the reactor to initiate the exothermic polymerization. Temperature of the reactor was maintained at 45° C. by changing the temperature of the hexane feed and by using cooling water in the external reactor jacket. For a typical polymerization, the temperature of feed was −10° C. Ethene was introduced at the rate of 45 gms/min and propene was introduced at the rate of 310 gms/min. The polymerization catalyst, dimethyl silyl bridged (tetramethylcyclopentadienyl) cyclododecylamido titanium dimethyl activated 1:1 molar ratio with N',N'-Dimethyl anilinium-tetrakis (pentafluorophenyl)borate was introduced at the rate of 0.002780 gms/hr. A dilute solution of triisobutyl aluminum was introduced into the reactor as a scavenger of catalyst terminators: a rate of approximately 36.8 mole per mole of catalyst was adequate for this polymerization.

After five residence times of steady polymerization, a representative sample of the polymer produced in this polymerization was collected. The solution of the polymer was withdrawn from the top, and then steam distilled to isolate the polymer. The rate of formation of the polymer was 258 gms/hr. The polymer produced in this polymerization had an ethylene content of 14.1 wt. %, ML@125 (1+4) of 95.4.

Variations in the composition of the polymer were obtained principally by changing the ratio of ethene to propene. Molecular weight of the polymer could be increased by a greater amount of ethene and propene compared to the amount of the polymerization catalyst. These polymers are described as aePP in the Tables below.

Example 3

Analysis and Solubility of Several Second Polymer Components

In the manner described in Example 1 above, several second polymer components of the above specification were synthesized. These are described in the table below. Table 1 describes the results of the GPC, composition, ML and DSC analysis for the polymers.

TABLE 1

ANALYSIS OF THE SECOND POLYMER COMPONENT AND THE COMPARATIVE POLYMERS.

|  | (Mn) by GPC | (Mw) by GPC | Ethylene wt % by IR | Heat of Fusion J/g | Melting Point by DSC (° C.) | ML (1 + 4) @1 25° C. |
|---|---|---|---|---|---|---|
| FPC |  |  |  |  |  |  |
| FPC-1 | 102000 | 248900 | 7.3 | 71.9 | 84.7 | 14 |
| FPC-2 |  |  | 9.4 | 30.2 | 65.2 | 27.8 |
| FPC-3 | 124700 | 265900 | 11.6 | 17.1 | 43.0 | 23.9 |
| FPC-4 |  |  | 12.8 | 16.4 | 42.5 |  |
| FPC-5 |  |  | 14.7 | 13.2 | 47.8 | 38.4 |
| FPC-6 | 121900 | 318900 | 16.4 | 7.8 | 40.3 | 33.1 |
| FPC-7 |  |  | 17.8 | 5.3 | 39.5 |  |
| Comparative Polymers |  |  |  |  |  |  |
| EPR |  |  | 47.8 | not detected | not detected | 40 |
| AePP |  |  | 11.7 | not detected | not detected | 23 |

TABLE 2

SOLUBILITY OF FRACTIONS OF THE SECOND POLYMER COMPONENT.

|  | Wt. % Soluble at 23° C. | Wt. % Soluble at 31° C. | Wt. % Soluble at 40° C. | Wt. % Soluble at 48° C. |
|---|---|---|---|---|
| FPC |  |  |  |  |
| FPC-1 | 1.0 | 2.9 | 28.3 | 68.5 |
| FPC-3 | 6.5 | 95.7 |  |  |
| FPC-6 | 51.6 | 52.3 | 2.6 |  |
| FPC-5 | 36.5 | 64.2 |  |  |
| Comparative Polymers |  |  |  |  |
| EPR | 101.7 |  |  |  |
| aePP | 100.5 |  |  |  |

Table 2 describes the solubility of the second polymer component. Sum of the fractions add up to slightly more than 100 due to imperfect drying of the polymer fractions.

TABLE 3

COMPOSITION OF FRACTIONS OF THE SECOND POLYMER COMPONENT OBTAINED IN TABLE 2.

Composition: Wt % ethylene in fraction

|  | Soluble at 23° C. | Soluble at 31° C. | Soluble at 40° C. | Soluble at 48° C. | Soluble At 56° C. |
|---|---|---|---|---|---|
| FPC |  |  |  |  |  |
| FPC-1 |  |  |  | 8.0 | 7.6 |
| FPC-3 | 12.0 | 11.2 |  |  |  |
| FPC-6 | 16.8 | 16.5 |  |  |  |
| FPC-5 | 14.9 | 14.6 |  |  |  |
| Comparative |  |  |  |  |  |
| EPR | 46.8 |  |  |  |  |
| Atactic ePP | 11.8 |  |  |  |  |

Table 3 describes the composition of the fractions of the second polymer component obtained in Table 2. Only fractions which have more than 4% of the total mass of the polymer have been analyzed for composition. The experimental inaccuracy in determination of the ethylene content is believed to 0.4 wt % absolute.

Example 4

Table 4 shows compounds that were formulated using a Mixture Design methodology. A 2 MFR polypropylene homopolymer was selected as the SPC. For this design FPC was varied from 30 to 70 wt. %, SPC from 15 to 45 wt. %, Calcium Carbonate from 5 to 20 wt. % and oil from 5 to 15 wt. %. An optimal design was used to identify the data point in this constrained design space. A quadratic model was selected as the preferred response. This model requires 10 design points to estimate the coefficients of the model. Ten additional design points were included to estimate the lack of fit and pure error.

Formulations 1 to 20 show the results from this experimental design. The compound hardness ranges from 68 Shore A to 93 Shore A. The compounds with higher FPC levels in general have lower hardness. The tensile strength of the compounds varies from 8 to 16 MPa. Tensile properties are strongly dependent on the crystalline SPC polymer content in the formulation. Higher SPC contents result in increased tensile strength, 100% Modulus and compound tear properties.

Example 5

Table 5 shows compounds (formulations 21 to 40) that were formulated using a polypropylene random copolymer. Similar to Example 1, a mixture design methodology was used to set the formulations. The purpose of using a PP random copolymer was to lower compound hardness. The compound hardness ranges from 59 Shore A to 89 Shore A depending upon the ratio of SPC to FPC in the formulation. Physical properties follow the same trend as described in Example 1.

Example 6

Table 6 shows formulations using only the FPC (FPC-6 in Table 1) (SPC).

TABLE 4

PHYSICAL PROPERTIES OF COMPOUND WITH POLYPROPYLENE HOMOPOLYMER COPOLYMER (MIXTURE DESIGN)

| Formulation |  | 1 | 2 | 3 | 4 | 5 | 6 | 7 | 8 | 9 | 10 | 11 | 12 |
|---|---|---|---|---|---|---|---|---|---|---|---|---|---|
| FPC (Melt Index = 25) |  | 60 | 50 | 30 | 30 | 70 | 30 | 70 | 50 | 30 | 50 | 58 | 45 |
| SPC (Escorene ® 4292) |  | 22 | 30 | 35 | 45 | 20 | 45 | 15 | 30 | 45 | 15 | 33 | 45 |
| Calcium Carbonate |  | 11 | 5 | 20 | 20 | 5 | 10 | 5 | 5 | 20 | 20 | 5 | 5 |
| Oil (Sunpar 2280) |  | 8 | 15 | 15 | 5 | 5 | 15 | 10 | 15 | 5 | 15 | 5 | 5 |
| Antioxidant (Irganox 1010) |  | 0.2 | 0.2 | 0.2 | 0.2 | 0.2 | 0.2 | 0.2 | 0.2 | 0.2 | 0.2 | 0.5 | 0.5 |
| Physical Properties @ 21° C., from sheets pressed for 8 min. @ 200° C./cooled for 5 min. |  |  |  |  |  |  |  |  |  |  |  |  |  |
| Hardness | Shore A | 79 | 84 | 91 | 91 | 76 | 91 | 68 | 85 | 93 | 72 | 89 | 93 |
| 100% Modulus | MPa | 2.9 | 3.4 | 7.0 | 9.9 | 2.6 | 9.1 | 1.8 | 4.3 | 10.5 | 2.1 | 4.6 | 8.4 |
| Tensile @ Brk | MPa | 14.2 | 10.9 | 13.1 | 15.1 | 16.6 | 14.7 | 13.7 | 8.7 | 14.8 | 9.7 | 14.7 | 16.1 |
| Elongation | % | 893 | 795 | 774 | 660 | 933 | 738 | 994 | 545 | 690 | 993 | 827 | 755 |
| Physical Properties @ 50° C. |  |  |  |  |  |  |  |  |  |  |  |  |  |
| 20% Modulus | MPa | 0.9 | 1.0 | 4.0 | 7.0 | 0.7 | 4.3 | 0.4 | 1.6 | 7.3 | 0.5 | 1.5 | 4.3 |
| 100% Modulus | MPa | 0.8 | 1.3 | 4.9 | 7.3 | 0.9 | 5.5 | 0.6 | 2.0 | 7.5 | 0.6 | 1.9 | 5.0 |
| Tensile @ Brk | MPa | 1.9 | 1.6 | 7.1 | 9.9 | 2.0 | 7.5 | 1.3 | 2.5 | 9.9 | 1.1 | 3.3 | 5.4 |
| Elongation | % | 14.2 | 10.9 | 13.1 | 15.1 | 16.6 | 14.7 | 13.7 | 8.7 | 14.8 | 9.7 | 696 | 609 |
| Tear Strength @ 21° C. |  |  |  |  |  |  |  |  |  |  |  |  |  |
| Tear, Die C (Peak Value) | KN/m | 48 | 57 | 63 | 95 | 45 | 82 | 35 | 61 | 101 | 34 | 70 | 82 |
| Trouser Tear (Peak Value) | KN/m | 35 | 35 | 42 | 60 | 30 | 54 | 23 | 46 | 61 | 27 | 51 | 58 |
| Heat Aging 28 days @ 70° C. |  |  |  |  |  |  |  |  |  |  |  |  |  |
| Tensile Strength | MPa | 10.9 | 8.7 | 11.7 | 15.8 | 15.5 | 14.4 | 11.9 | 8.8 | 14.9 | 8.9 | 15.0 | 16.4 |
| Elongation | % | 704 | 654 | 637 | 626 | 862 | 688 | 921 | 612 | 645 | 887 | 725 | 660 |
| Tack by strip peel |  |  |  |  |  |  |  |  |  |  |  |  |  |
| Tack (Peak Force) | N | 43 | 60 | 24 | 12 | 42 | 0 | 22 | 23 | 12 | 43 | 47 | 72 |
| Compound MFR | G/10 min | 4.1 | 6.7 | 5.0 | 2.3 | 4.0 | 4.4 | 5.9 | 5.7 | 2.6 | 6.1 | 3.5 | 3.3 |

TABLE 4-continued

PHYSICAL PROPERTIES OF
COMPOUND WITH POLYPROPYLENE HOMOPOLYMER COPOLYMER (MIXTURE DESIGN)

| Formulation | | 13 | 14 | 15 | 16 | 17 | 18 | 19 | 20 |
|---|---|---|---|---|---|---|---|---|---|
| FPC (Melt Index = 25) | | 40 | 70 | 60 | 30 | 58 | 60 | 50 | 40 |
| SPC (Escorene ® 4292) | | 25 | 15 | 15 | 45 | 15 | 15 | 28 | 37 |
| Calcium Carbonate | | 20 | 5 | 20 | 10 | 13 | 20 | 11 | 16 |
| Oil (Sunpar 2280) | | 15 | 10 | 5 | 15 | 15 | 5 | 10 | 8 |
| Antioxidant (Irganox 1010) | | 0.5 | 0.5 | 0.5 | 0.5 | 0.5 | 0.5 | 0.5 | 0.5 |
| Physical Properties @ 21° C., from sheets pressed for 8 min. @ 200° C./cooled for 5 min. | | | | | | | | | |
| Hardness | Shore A | 82 | 69 | 77 | 93 | 68 | 75 | 85 | 90 |
| 100% Modulus | MPa | 3.6 | 1.9 | 2.3 | 9.5 | 1.6 | 1.9 | 4.7 | 8.3 |
| Tensile @ Brk | MPa | 11.2 | 11.0 | 13.4 | 15.6 | 9.5 | 12.0 | 15.6 | 15.5 |
| Elongation | % | 811 | 892 | 938 | 763 | 947 | 885 | 864 | 787 |
| Physical Properties @ 50° C. | | | | | | | | | |
| 20% Modulus | MPa | 0.1 | 0.3 | 0.6 | 5.4 | 0.4 | 0.6 | 1.6 | 4.3 |
| 100% Modulus | MPa | 1.7 | 0.5 | 0.8 | 6.3 | 0.5 | 0.8 | 2.0 | 5.1 |
| Tensile @ Brk | MPa | 2.3 | 0.4 | 1.9 | 8.1 | 1.1 | 1.8 | 2.8 | 6.2 |
| Elongation | % | 513 | 1018 | 920 | 550 | 1000 | 980 | 436 | 385 |
| Tear Strength @ 21° C. | | | | | | | | | |
| Tear, Die C (Peak Value) | KN/m | 49 | 36 | 39 | 78 | 32 | 38 | 60 | 73 |
| Trouser Tear (Peak Value) | KN/m | 32 | 22 | 27 | 63 | 22 | 32 | 41 | 55 |
| Heat Aging 28 days @ 70° C. | | | | | | | | | |
| Tensile Strength | MPa | 10.7 | 10.5 | 11.1 | 11.9 | 8.6 | 13.3 | 14.3 | 15.6 |
| Elongation | % | 732 | 822 | 824 | 4770 | 871 | 816 | 760 | 703 |
| Tack by strip peel | | | | | | | | | |
| Tack (Peak Force) | N | 0 | 50 | 75 | 16 | 41 | 4 | 42 | 59 |
| Compound MFR | G/10 min | 5.7 | 5.1 | 3.6 | 5.1 | 6.2 | 3.6 | 4.4 | 3.7 |

TABLE 5

PHYSICAL PROPERTIES OF COMPOUND WITH POLYPROPYLENE RANDOM COPOLYMER

| Formulation | | 21 | 22 | 23 | 24 | 25 | 26 | 27 | 28 | 29 | 30 | 31 |
|---|---|---|---|---|---|---|---|---|---|---|---|---|
| FPP (Melt Index = 25) | | 64 | 40 | 40 | 65 | 40 | 75 | 47 | 75 | 45 | 65 | 40 |
| SPP (Escorene PD ® 9272, 2.8 MFR) | | 17 | 45 | 35 | 10 | 30 | 10 | 34 | 10 | 10 | 10 | 35 |
| Calcium Carbonate | | 11 | 10 | 5 | 5 | 25 | 10 | 11 | 5 | 25 | 5 | 5 |
| Process Oil (Sunpar 2280) | | 8 | 5 | 20 | 20 | 5 | 5 | 8 | 10 | 20 | 20 | 20 |
| Antioxidant (Irganox 1010) | | 0.20 | 0.20 | 0.20 | 0.20 | 0.20 | 0.20 | 0.20 | 0.20 | 0.20 | 0.20 | 0.20 |
| Physical Properties @ 21° C., from sheets pressed for 8 min @ 200° C./cooled for 5 min. | | | | | | | | | | | | |
| Hardness | Shore A | 69 | 93 | 76 | 52 | 86 | 63 | 87 | 60 | 57 | 54 | 80 |
| 100% Modulus | MPa | 1.5 | 6.8 | 3.3 | 1.0 | 4.6 | 1.5 | 4.1 | 1.3 | 1.1 | 1.0 | 3.9 |
| 200% Modulus | MPa | 1.8 | 7.2 | 4.0 | 1.2 | 5.2 | 1.7 | 4.8 | 1.5 | 1.2 | 1.2 | 4.4 |
| 300% Modulus | MPa | 2.2 | 7.6 | 4.6 | 1.4 | 5.7 | 2.0 | 5.4 | 1.8 | 1.5 | 1.5 | 4.8 |
| Tensile @ Brk | MPa | 10.0 | 14.0 | 8.6 | 7.4 | 14.2 | 9.9 | 15.8 | 11.4 | 6.0 | 8.4 | 9.9 |
| Elongation | % | 1110 | 778 | 845 | 1115 | 865 | 980 | 980 | 1056 | 1094 | 1136 | 910 |
| Tear Strength | | | | | | | | | | | | |
| Tear, Die C (Peak Value) | KN/m | 28 | 69 | 45 | 19 | 53 | 22 | 50 | 21 | 15 | 18 | 45 |
| Tack by Strip Peel | | | | | | | | | | | | |
| Tack (Peak Force) | N | 61 | 6 | 16 | 41 | 8 | 56 | 10 | 46 | 28 | 35 | 5 |
| Compound MFR | G/10 min | 4.7 | 4.6 | 9.6 | 10.0 | 3.5 | 4.1 | 5.0 | 5.5 | 9.9 | 9.3 | 10.1 |
| Formulation | | 32 | 33 | 34 | 35 | 36 | 37 | 38 | 39 | 40 | | |
| FPP (Melt Index = 25) | | 53 | 60 | 45 | 50 | 60 | 40 | 55 | 60 | 40 | | |
| SPP (Escorene PD ® | | 23 | 10 | 10 | 20 | 30 | 25 | 10 | 30 | 45 | | |

TABLE 5-continued

PHYSICAL PROPERTIES OF COMPOUND WITH POLYPROPYLENE RANDOM COPOLYMER

| | | | | | | | | | | |
|---|---|---|---|---|---|---|---|---|---|---|
| 9272, 2.8 MFR | | | | | | | | | | |
| Calcium Carbonate | | 13 | 25 | 25 | 25 | 5 | 15 | 15 | 5 | 10 |
| Process Oil (Sunpar 2280) | | 11 | 5 | 20 | 5 | 5 | 20 | 20 | 5 | 5 |
| Antioxidant (Irganox 1010) | | 0.20 | 0.20 | 0.20 | 0.20 | 0.20 | 0.20 | 0.20 | 0.20 | 0.20 |
| Physical Properties @ 21° C., from sheets pressed for 8 min @ 200° C./cooled for 5 min. | | | | | | | | | | |
| Hardness | Shore A | 74 | 70 | 59 | 80 | 82 | 75 | 55 | 81 | 89 |
| 100% Modulus | MPa | 2.2 | 1.6 | 1.0 | 2.4 | 3.1 | 2.5 | 0.9 | 2.9 | 6.3 |
| 200% Modulus | MPa | 2.8 | 1.8 | 1.2 | 2.9 | 3.8 | 3.0 | 1.0 | 3.7 | 6.6 |
| 300% Modulus | MPa | 3.4 | 2.1 | 1.4 | 3.5 | 4.5 | 3.5 | 1.2 | 4.4 | 7.1 |
| Tensile @ Brk | MPa | 12.1 | 10.7 | 5.7 | 11.6 | 14.1 | 9.5 | 4.5 | 14.5 | 16.9 |
| Elongation | % | 1010 | 1044 | 1197 | 902 | 885 | 957 | 1043 | 920 | 800 |
| Tear Strength | | | | | | | | | | |
| Tear, Die C (Peak Value) | KN/m | 33 | 23 | 16 | 34 | 44 | 33 | 16 | 44 | 64 |
| Tack by Strip Peel | | | | | | | | | | |
| Tack (Peak Force) | N | 25 | 54 | 27 | 42 | 15 | 6 | 31 | 14 | 4 |
| Compound MFR | G/10 min | 5.9 | 3.6 | 10.0 | 3.7 | 4.5 | 9.7 | 9.9 | 4.4 | 4.4 |

TABLE 6

PHYSICAL PROPERTIES OF

| Filler Description | Plasticizer Sunpar 150 | Filler wt % | MFR (g/10 min) | Stress @ 500% Extension (psi) | 200% tension Set (%) |
|---|---|---|---|---|---|
| Carbon Black N234 | 0 phr | 7.1 | 9.1 | 555 | 2.1 |
| | 0 phr | 13.8 | 9.0 | 702 | 2.1 |
| | 0 phr | 20.8 | 4.9 | 853 | 0.0 |
| | 0 phr | 32.0 | 0.0 | 924 | 3.1 |
| | 0 phr | 40.0 | too low | 1259 | 4.2 |
| | 9 phr | 6.9 | — | — | — |
| | 9 phr | 14.2 | 5.6 | — | — |
| | 9 phr | 21.1 | 2.5 | 467 | 2.3 |
| Carbon Black N550 | 0 phr | 7.1 | 2.1 | 696 | 1.0 |
| | 0 phr | 13.8 | 8.0 | 742 | 2.1 |
| | 0 phr | 20.8 | 6.2 | 857 | 1.6 |
| | 0 phr | 32.0 | 0.4 | 953 | 1.6 |
| | 0 phr | 40.0 | 0.03 | 1157 | 2.1 |
| | 9 phr | 6.9 | 9.3 | 547 | 1.0 |
| | 9 phr | 14.2 | 7.2 | 650 | 0.5 |
| | 9 phr | 21.1 | 24.4 | 718 | 0.0 |
| Carbon Black N762 | 0 phr | 7.1 | 7.7 | 621 | 1.6 |
| | 0 phr | 13.8 | 7.3 | 697 | 1.6 |
| | 0 phr | 20.8 | 5.6 | 824 | 2.1 |
| | 0 phr | 32.0 | 1.0 | 797 | 1.4 |
| | 0 phr | 40.0 | 0.1 | 934 | 2.1 |
| | 0 phr | 50.0 | too low | 1104 | 2.3 |
| | 9 phr | 6.9 | 12.4 | 513 | 0.5 |
| | 9 phr | 14.2 | 13 | 539 | 0.0 |
| | 9 phr | 21.1 | 5.9 | 527 | 0.5 |
| Silica HiSil 233 | 0 phr | 7.1 | 23.8 | 561 | 5.1 |
| | 0 phr | 13.8 | 11.8 | 629 | 6.3 |
| | 0 phr | 20.8 | 4.6 | 719 | 8.3 |
| | 0 phr | 32.0 | 0.01 | 836 | 5.2 |
| | 0 phr | 40.0 | too low | — | — |
| | 9 phr | 6.9 | 24.7 | 462 | 1.6 |
| | 9 phr | 14.2 | 22.8 | 487 | 1.6 |
| | 9 phr | 21.1 | 7.3 | 562 | 0.4 |
| Silica Silene 732D | 0 phr | 7.1 | 17.3 | 531 | 5.1 |
| | 0 phr | 13.8 | 19.2 | 714 | 3.9 |
| | 0 phr | 20.8 | 28.2 | 780 | 6.3 |
| | 0 phr | 32.0 | 0.8 | 1017 | 1.6 |
| | 0 phr | 40.0 | 0.03 | 1176 | 2.3 |
| | 9 phr | 6.9 | 25.2 | 525 | 0.8 |
| | 9 phr | 14.2 | 27.3 | 554 | 1.1 |
| | 9 phr | 21.1 | 37.2 | 475 | 0.5 |
| Clay Translink 37 | 0 phr | 7.1 | 5.2 | 605 | 1.6 |
| | 0 phr | 13.8 | 5.0 | 641 | 1.6 |
| | 0 phr | 20.8 | 4.3 | 664 | 1.6 |
| | 0 phr | 32.0 | 3.1 | 750 | 1.6 |
| | 0 phr | 40.0 | 2.7 | 697 | 2.1 |
| | 9 phr | 6.9 | — | 465 | 1.6 |
| | 9 phr | 14.2 | — | 509 | 1.6 |
| | 9 phr | 21.1 | — | 563 | 2.6 |
| Nano-Clay Cloisite 20A | 0 phr | 1.6 | 21.1 | 430 | 2.0 |
| | 0 phr | 3.3 | 22.2 | 409 | 2.0 |
| | 0 phr | 5.0 | 30.2 | 348 | 3.1 |
| | 0 phr | 13.8 | 1.3 | 517 | 0.9 |
| | 0 phr | 20.8 | 3.9 | 514 | 0.0 |
| | 9 phr | 1.8 | 44.1 | 284 | 2.6 |

Although the present invention has been described in considerable detail with reference to certain preferred versions thereof, other versions are possible. For example, other blend components can be used and multiples of the recited components may be used. Therefore the spirit and scope of the appended claims should not be limited to the description of the preferred versions contained herein.

What is claimed is:

1. A thermoplastic membrane formed from a blend of:
    a) from 30 to 97 percent by weight of a semicrystalline first polymer component (FPC), wherein said FPC comprises a propylene-ethylene copolymer containing from 80 to 93 percent by weight of units derived from propylene, and having a melting point derived from stereoregular polypropylene sequences, as determined by differential scanning calorimetry (DSC), in the range of from 25° C. to 70° C., and a heat of fusion of from 2 J/g to 25 J/g;
    b) from 1 to 40 percent by weight of an inorganic filler;
    c) from 1 to 25 percent by weight of a processing oil; and
    d) from 1 to 40 percent by weight of a crystalline second polymer component (SPC), wherein said SPC is a stereoregular polypropylene containing less than 7 percent by weight of units derived from ethylene or alpha-olefin monomer containing from 4 to 8 carbon atoms and having melting point, as determined by DSC, greater than 130° C., and a heat of fusion greater than 80 J/g;

wherein the sum of components in said blend is 100 percent.

2. The membrane of claim 1 having of the following properties:

a) tensile strength≧0.1×(Shore A hardness-60)+2 b) tear strength (Die C)≧Shore A hardness-60, and c) tack≧0.25×(Shore A hardness-60).

3. The membrane of claim 1 wherein said blend further comprises an additional first polymer component (FPC2), wherein said FPC2 is a second propylene-ethylene copolymer containing at least 75 weight percent units derived from propylene and at least 5 weight percent less units derived from propylene than the propylene-ethylene copolymer of claim 1, wherein said FPC2 has a melting point less than 100° C., a heat of fusion less than 60 J/g.

4. A thermoplastic membrane formed from a blend of:

a) from 35 to 96 percent by weight of a semicrystalline first polymer component (FPC), wherein said FPC comprises a propylene-ethylene copolymer containing from 80 to 93 percent by weight of units derived from propylene, and having a melting point derived from stereoregular polypropylene sequences, as determined by differential scanning calorimetry (DSC), in the range of from 25° C. to 70° C., and a heat of fusion of from 2 J/g to 25 J/g;

b) from 1 to 40 percent by weight of an inorganic filler;

c) from 1 to 25 percent by weight of a processing oil; and d) from 2 to 35 percent by weight of a crystalline second polymer component (SPC), wherein said SPC is a stereoregular polypropylene containing less than 7 percent by weight of units derived from ethylene or alpha-olefin monomer containing from 4 to 8 carbon atoms and having melting point, as determined by DSC, greater than 130° C., and a heat of fusion greater than 80 J/g;

wherein the sum of components in said blend is 100 percent, said membrane having the following properties:

1) tensile strengths≧0.1×(Shore A hardness-60)+2

2) tear strength (Die C)≧Shore A hardness-60, and 3) tack≧0.25×(Shore A hardness-60).

5. The membrane of claim 4 further having tack greater than or equal to 5 KN/m².

6. The membrane of claim 5 further having tension set after momentary orientation to 200% elongation of less than 20%.

7. The membrane of claim 6 further having a MFR of the blend composition from which said membrane is formed of greater than or equal to 1 g/10 min.

8. The membrane of claim 7 wherein said blend further comprises an additional first polymer component (FPC2), wherein said FPC2 is a second propylene-ethylene copolymer containing at least 75 weight percent units derived from propylene and at least 5 weight percent less units derived from propylene than the propylene-ethylene copolymer of claim 1, wherein said FPC2 has a melting point less than 100° C., a heat of fusion less than 60 J/g.

9. The membrane of claim 1 wherein said membrane is further manipulated after fabrication by a technique selected from the group consisting of extrusion, calendering, orientation in the range of from 10–400% and combinations thereof, said orientation being in a direction selected from the group consisting of machine direction (MD), transverse direction (TD) and biaxially;

wherein said membrane is annealed for up to 24 hours at up to 140° C.

10. The membrane of any of claim 1 wherein said membrane is laminated or coextruded with a thermoplastic on one or both sides of the membrane.

11. The membrane of any of the claim 1 wherein said membrane is a cast membrane.

12. Roof sheeting formed from the membrane of claim 1.

13. An article of manufacture formed from the membrane of claim 1.

* * * * *